United States Patent
Narita et al.

(10) Patent No.: US 8,678,437 B2
(45) Date of Patent: Mar. 25, 2014

(54) IMPACT ABSORBING STEERING APPARATUS

(75) Inventors: Noritomo Narita, Gunma (JP); Kou Yamamoto, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/202,444

(22) PCT Filed: Jul. 25, 2011

(86) PCT No.: PCT/JP2011/066882
§ 371 (c)(1),
(2), (4) Date: Dec. 21, 2011

(87) PCT Pub. No.: WO2012/017853
PCT Pub. Date: Feb. 9, 2012

(65) Prior Publication Data
US 2012/0080873 A1    Apr. 5, 2012

(30) Foreign Application Priority Data

Aug. 5, 2010  (JP) ................................ 2010-175875
Aug. 17, 2010 (JP) ................................ 2010-182127

(51) Int. Cl.
*B62D 1/19*    (2006.01)

(52) U.S. Cl.
USPC ........... 280/777; 280/775; 280/779; 188/371; 74/493

(58) Field of Classification Search
USPC ................. 280/777, 775, 779, 780; 188/371; 74/492, 493
See application file for complete search history.

(56) References Cited

U.S. PATENT DOCUMENTS

| 5,378,021 A | 1/1995 | Yamaguchi et al. |
| 5,605,352 A * | 2/1997 | Riefe et al. ..................... 280/777 |

(Continued)

FOREIGN PATENT DOCUMENTS

| DE | 102008034807 | 10/2009 |
| EP | 1 992 544 | 11/2008 |

(Continued)

OTHER PUBLICATIONS

International Search Report and Written Opinion of the International Searching Authority dated Nov. 1, 2011, from corresponding International Application No. PCT/JP2011/066882.

(Continued)

*Primary Examiner* — Keith Frisby
(74) *Attorney, Agent, or Firm* — Katten Muchin Rosenman LLP

(57) ABSTRACT

Construction of an impact absorbing steering wheel apparatus that is capable of obtaining excellent performance at low cost while maintaining the freedom of design is achieved. An energy absorbing member 36a, 36b is provided between a tightening rod 27a that displaces in the forward direction together with an outer column 13a during a secondary collision and a housing 16 or support pin 63 that does not displace in the forward direction during a secondary collision, and being a member that plastically deforms as the outer column displaces in the forward direction during a secondary collision, absorbs part of the impact energy by the relative movement of the plastic deformation. Part of the energy absorbing member 36a, 36b is fastened to the tightening rod 27a, and plastic deformation of this member 36a, 36b is restricted in the width direction by a pair of held wall sections 11a of the outer column 13a.

10 Claims, 24 Drawing Sheets

(56) References Cited

U.S. PATENT DOCUMENTS

| | | |
|---|---|---|
| 8,366,149 B2 | 2/2013 | Sulser et al. |
| 2005/0087970 A1* | 4/2005 | Ulintz .................. 280/775 |
| 2007/0137377 A1* | 6/2007 | Kamei .................. 74/493 |
| 2008/0284150 A1 | 11/2008 | Yamada |
| 2011/0115206 A1 | 5/2011 | Sulser et al. |

FOREIGN PATENT DOCUMENTS

| | | | |
|---|---|---|---|
| JP | 63-46972 | 2/1988 | |
| JP | 2-132576 | 11/1990 | |
| JP | 5-75057 | 10/1993 | |
| JP | 8-295251 | 11/1996 | |
| JP | 10-315986 | 12/1998 | |
| JP | 2000-6820 | 1/2000 | |
| JP | 2000-95116 | 4/2000 | |
| JP | 2001-80527 | 3/2001 | |
| JP | 2001-334945 | 12/2001 | |
| JP | 2003002211 A * | 1/2003 | ............... B62D 1/19 |
| JP | 2004-299489 | 10/2004 | |
| JP | 2006-312360 | 11/2006 | |
| JP | 2008-13110 | 1/2008 | |
| JP | 2008-18820 | 1/2008 | |
| JP | 2010-155485 | 7/2010 | |

OTHER PUBLICATIONS

Supplementary European Search Report dated Jun. 18, 2013, from corresponding European Application No. 11743173.4-1755.

* cited by examiner

IMPACT ABSORBING STEERING APPARATUS

TECHNICAL FIELD

The present invention relates to the improvement of an impact absorbing steering apparatus that is capable of absorbing impact energy that is applied to a steering wheel from the body of a driver during a collision accident, while the steering wheel displaces in the forward direction.

BACKGROUND ART

As illustrated in FIG. 18, the steering apparatus of an automobile is constructed such that it applies a steering angle to the front wheels by transmitting the rotation of a steering wheel 1 to an input shaft 3 of a steering gear unit 2, and pushing or pulling a pair of left and right tie rods 4 as the input shaft 3 rotates. The steering wheel 1 is supported by and fastened to the rear end section of a steering shaft 5, and with the steering shaft 5 passed in the axial direction through a cylindrical shaped steering column 6, the steering shaft 5 is supported such that it can rotate freely. The front end section of the steering shaft 5 is connected to the rear end section of an intermediate shaft 8 via a universal joint 7, and the front end section of the intermediate shaft 8 is connected to the input shaft 3 via a separate universal joint 9.

During a collision accident, after a primary collision of an automobile with another automobile, a secondary collision occurs in which the body of the driver hits the steering wheel. Therefore, in order to protect the driver, it is necessary for this kind of steering apparatus for an automobile to have construction such that impact energy will be absorbed during a collision accident while the steering wheel displaces in the forward direction. As this kind of construction, patent literature 1 to 5 disclose construction in which the steering column that supports the steering wheel is supported with respect to the vehicle body such that it is capable of collapsing forward due to an impact load, in the forward direction during a secondary collision, and an energy absorbing member that absorbs the impact load by plastically deforming is provided between the vehicle body and a member that displaces forward together with this steering column, with such construction already being widely used.

FIGS. 19 to 22 illustrate an example of the construction of an automobile steering apparatus that comprises this kind of impact absorbing function. This construction comprises a tilting mechanism for adjusting the vertical position of the steering wheel 1 (FIG. 18), and a telescoping mechanism for adjusting the forward/backward position thereof, and further comprises a steering column 6a, a support bracket 10, a pair of left and right held wall sections 11 that are provided on the steering column 6a side, and, a bracket 12 on the vehicle body side. Of these, the steering column 6a is constructed such that the entire length can extend or contract by fitting together the front section of an outer column 13 on the rear side with the rear section of an inner column 14 on the front side such that they can displace relative to each other in the axial direction. A steering shaft 5a is supported on the inner-diameter side of this kind of steering column 6a such that it can rotate freely. This steering shaft 5a is also constructed such that it can extend or contract along the entire length by combining together an outer shaft and an inner shaft.

A housing 16 for installing component parts of an electric-powered steering apparatus such as an electric motor 15 (FIG. 18) and reduction gear is connected and fastened to the front end, section of the steering column 6a. This housing 16 is supported by part of the vehicle body by a bolt (not illustrated in the figure) that is inserted through a support pipe 17 that is provided in the width direction at the top of the housing such that the housing can pivot. The steering wheel 1 is fastened to the rear end section of the steering shaft in the portion that extends further to the rear than the steering column 6a. Moreover, the portion of the front end section of the steering shaft 5a that protrudes further forward than the steering column 6a is connected to an intermediate shaft 8 (FIG. 18) by way of a universal joint 7. Here, the width direction is the width direction of the vehicle when the steering apparatus is assembled in the vehicle.

The support bracket 10 is connected to and supported by the bracket 12 on the vehicle body side, such that it can displace in the forward direction and break away when being subjected to the impact load due to a secondary collision. The support bracket 10 is made of a metal plate such as steel plate having sufficient strength and rigidity, and is formed by connecting and fastening together a top plate 18 and a pair of side plates 19a, 19b by welding or the like. Of these, both end sections in the width direction of the top plate 18 function as connection plate sections 20 for supporting and, connecting the support bracket 10 to the bracket 12 on the vehicle side. As illustrated in FIG. 22, cut out sections 21 that open up the edge on the rear end of the connection plate sections 20 are formed in the center section in the width direction of these connection, plate sections 20, and capsules 22 are mounted in each of these cut out sections 21.

These capsules 22 are made of a material that slides easily over the metal plate of the top plate 18 such as a synthetic resin or a soft metal including an aluminum alloy. In the normal state, these capsules 22 do not come out from the cut out sections 21, however, when a large impact load is applied in the forward direction to the support bracket 10, members that lock the support bracket 10 inside the cut out sections 21, for example, support pins that span between the top plate 18 and these capsules 22 shear off and the capsules come out of the cut out sections 21 toward the rear. Through holes 23 through which bolts or studs are passed for supporting and connecting the support bracket 10 to the bracket 12 on the vehicle side are provided in the center section of each of these capsules 22. In order to support and connect the support bracket 10 to the bracket 12 on the vehicle side, a holt is inserted from bottom to top through the through holes 23 of the capsules 22 and screwed into a nut 24 that is supported by and fastened to the bracket 12 on the vehicle side by welding or the like, and tightened. This bracket 12 on the vehicle side is fastened to the vehicle side beforehand, so by tightening the bolt, the support bracket 10 is fastened to and supported by the vehicle body such that it can collapse forward only when a large impact load is applied in the forward direction. The support bracket 10 can also be connected to and supported by the bracket 12 on the vehicle side by inserting a stud that is fastened to the bottom surface of the bracket 12 on the vehicle side from top to bottom through the through hole 23 in the capsule 22 and screwing the bottom end, section of this stud to a nut and tightening.

In a pair of holding plate sections 25a, 25h of the side plates 19a, 19b which sandwich the outer column 13 from the both side, long holes 26 are formed at portions that are aligned with each other. These long holes 26 in the vertical direction are formed into a partial circular arc shape around the center axis of the support pipe 17 as the center. The outer column 13 is supported between the side plates 19a, 19b by a tightening rod 27 that is inserted through these long vertical holes 26. In order for this, held, wall sections 11 are formed on the upper part of the front section of the outer column 13, and long holes 28 in the forward/backward direction are formed in these held wall sections 11 in the axial direction of the outer column 13 (FIG. 4 and FIG. 6). The outer column 13 is supported on the support bracket 10 by way of the tightening rod 27 that is inserted through the long holes 26 in the vertical direction and the long holes 28 in the forward/backward direction. Therefore, the outer column 13 can pivot in the up or down direction around a bolt that is inserted through the support pipe 17 within the range that the tightening rod 27 can be displaced inside the vertical long holes 26. The outer column 13 can also displace forward and backward (axial direction) within the range that the tightening rod 27 can be displaced inside the long holes 28 in the forward/backward direction.

An outward facing flange shaped rim section 29 is fastened to one end section (right end section in FIG. 20) of the tightening rod 27, and a cam unit 32 having a drive cam 30 and a driven cam 31 is provided on the other end section. By using an adjustment lever 33 to rotate and drive the drive cam 30, it is possible to increase or decrease the distance between the driven cam 31 and the rim section 29. By rotating the adjustment lever 33 in the downward direction when adjusting the position of the steering wheel 1, the distance between the driven cam 31 and the rim section 29 is increased, and in this state, the outer column 13 is displaced within the range that the tightening rod 27 can be displaced inside the long holes 26 in the vertical direction and inside the long holes 28 in the forward/backward direction. This adjusts the position of the steering wheel 1, which is supported by and fastened to the rear end section of the steering wheel shaft 5a that is supported inside this outer column 13 such that it rotates freely. The weight of the portion that raises and lowers together with the outer column 13 is supported by an equalizer spring 35 that is provided between the tightening rod 27 and a locking section 34 that is provided in the support bracket 10. Therefore, it is not necessary for the driver to carry the entire weight of these when adjusting the position of the steering wheel 1.

After the position of the steering wheel 1 has been adjusted, by rotating the adjustment lever 33 upward, the distance between the driven cam 31 and the rim section 29 is decreased. As a result, the inside surfaces of the holding plate sections 25a, 25b strongly come in contact against the outside surfaces of the held wall sections 11, and due to the frictional engagement between these surfaces, the steering wheel 1 is fastened in a vertical position. Moreover, the outer diameter of the front end section of the outer column 13 where the held wall sections 11 are located is decreased, the inner circumferential surface of the front end section of the outer column 13 comes in strong contact with the outer circumferential surface of the rear end section of the inner column 14, and due to the frictional engagement between these surfaces, the steering column 6a is unable to extend or contract. As a result, the front and rear positions of the steering wheel 1 are fastened.

In an automobile steering apparatus having this kind of construction, when a secondary collision occurs after a collision accident, the capsules 22 remain as they are on the side of the bracket 12 on the vehicle body side, while the support bracket 10 displaces in the forward direction. In other words, a large impact load in the forward direction that occurs due to a secondary collision is applied to this support bracket 10 from the steering wheel 1 via the steering shaft 5a, outer column 13 and tightening rod 27. The members that lock the capsules in the connection plate sections 20 shear off, and as these capsules 22 come out from the cut out sections 21, the support bracket 10 displaces in the forward direction. As a result, the steering wheel 1 also displaces in the forward direction, which makes it possible to lessen the impact that is applied to the body of the driver that hits against this steering wheel 1.

When the steering wheel 1 displaces in the forward direction in this way due to a secondary collision, preferably; from the aspect of protecting the driver, the impact energy that is applied to the steering wheel 1 from the body of the driver is absorbed, and the steering wheel 1 is caused to displace in the forward direction. For example, in the construction illustrated in FIG. 19 to FIG. 22, friction force that acts on the contact area between the outside surfaces of the held wall sections 11 and the inside surfaces of the holding plate sections 25a, 25b, and the friction force that acts on the contact area between the inner circumferential surface of the front section of the outer column 13 and the outer circumferential surface of the rear section of the inner column 14 become resistance to the displacement of the steering wheel 1 in the forward direction, and contributes to absorbing the impact energy. However, the ability for the friction force to absorb energy is unstable, and so that alone makes it difficult to completely protect the driver.

In regards to this, patent literature 2 discloses construction in which an energy absorbing member is provided between the vehicle body and the steering column that displaces in the forward direction during a secondary collision. In this construction, as illustrated in FIG. 23 and FIG. 24, an energy absorbing member 36, which is formed by bending a plastically deformable wire rod, is located between a support pin 38 that is fixed to the upper surface of the steering column 6b and a support casing 39 that is fastened to the vehicle body. When the steering column 6b displaces in the forward direction due to a secondary collision, the energy absorbing member 36 elongates from the state illustrated in FIG. 24A to the state illustrated in FIG. 24B. The energy required for this elongation is absorbed from the impact energy that is applied to the steering wheel from the driver's body, which lessens the impact that is applied to the driver's body.

An impact absorbing structure that uses this kind of energy absorbing member 36 can be assembled in the impact absorbing steering apparatus illustrated in FIG. 19 to FIG. 22, making it possible to improve the energy absorption capability, however, in order to obtain better performance at low cost while maintaining the freedom of design, improvements are desired according to the points below.

First, it is desired that the moment in the pivot direction that is applied to the outer column 13 of the steering column 6a during a secondary collision be reduced or eliminated. In other words, when the construction illustrated in FIG. 23 and FIG. 24 is incorporated in a steering apparatus, regardless of whether or not there is a steering wheel position adjustment device such as a tilt mechanism or telescoping mechanism, the installation position of the energy absorbing member 36 and the tightening rod 27 (FIG. 20) may be at right angles with respect to the center axis of the outer column 13. When there is this kind of offset, a moment in the pivot direction occurs during a secondary collision. In other words, the energy absorbing member 36 functions as a resistance to displacement in the forward direction of the outer column 13 during a secondary collision. As a result, a moment is applied to the steering column 13 with the tightening rod 27 as the pivot point and the energy absorbing member 36 as the input. Therefore, as the secondary collision proceeds, the friction state in the engagement between the outer circumferential surface of the front section of the outer column 13 and the inner circumferential surface of the rear section of the inner column 14 becomes unstable, and thus the energy absorption performance in this engagement section becomes unstable.

This kind of instability in the energy absorption performance can be reduced or eliminated by placing both the energy absorbing member 36 and tightening rod 27 on the same side in the vertical direction of the steering column 6a, 6b, and by reducing the offset in the orthogonal direction with respect to the center axis of the steering column 6a, 6b that exists between these members 36, 27. However, the tightening rod 27 is often located on the lower side of the steering column 6a, 6b. In this case, as illustrated in FIG. 23 and FIG. 24, construction is such that the energy absorbing member 36 is located between the steering column 6b and the vehicle body 37 located on the upper side of this steering column 6b, so it is not possible to reduce the momentum, and thus it is not possible to prevent the energy absorption performance from becoming unstable. In other words, in the construction illustrated in FIG. 23 and FIG. 24, when there is an intention to keep the moment small and prevent the energy absorption performance from becoming unstable, construction in which the tightening rod 27 is located on the lower side of the steering column cannot be employed, and freedom of design is limited. Moreover, in the construction illustrated in FIG. 23 and FIG. 24, the support pin 38 and support casing 39 become necessary as special part for installing the energy absorbing member 36, so an increase in cost is unavoidable.

RELATED LITERATURE

Patent Literature

[Patent Literature 1] Japanese Patent Application Publication No. 2000-095116
[Patent Literature 2] Japanese Patent Application Publication No. S63-046972
[Patent Literature 3] Japanese Patent Application Publication No. 2001-080527
[Patent Literature 4] Japanese Patent Application Publication No. 2006-312360
[Patent Literature 5] Japanese Patent Application Publication No. H2-132576

SUMMARY OF THE INVENTION

Problem to be Solved by the Invention

In consideration of the situation described above, the object of the present invention is to provide construction of an impact absorbing steering apparatus that is capable of excellent performance at low cost while maintaining freedom of design.

Means for Solving the Problems

The impact absorbing steering apparatus of the present invention comprises:
a steering column that comprises: an inner column that is located on the front side in a state in which the forward and backward position is regulated; and an outer column that fits around the rear section of the inner column such that relative displacement is possible in the axial direction, and that has a slit in the axial direction that is provided in the axial direction in the front section that fits with the inner column and enables the diameter of the front section to expand or constrict, a pair of held wall sections that are provided on the top surface or the bottom surface of the front section on both the left and right sides of the axial slit, and a pair of first through holes that are formed in these held wall sections at positions that are aligned with each other;
a steering shaft supported on the inner diameter side of the steering column that comprises; an inner shaft; and an outer shaft that fits around the rear section of the inner shaft such that relative displacement in the axial direction is possible, and the rear end section of the outer shaft protruding further toward the rear than an opening on the rear end of the outer column, a steering wheel being supported by and fastened to that rear end section;
a support bracket that comprises: a pair of left and right holding plate sections; a pair of second through holes that are formed in these holding plate sections in positions that are aligned with at least part of the first through holes; and an installation plate section that is supported by the vehicle body and that together with supporting the holding plate sections, is capable of dropping toward the front due to impact energy that is applied from the steering wheel to the outer column during a secondary collision;
a tightening rod that is inserted through the first through holes and second through holes, and that comprises a pair of pressure sections on both end sections;
a fastening unit that increases or decreases the space between the pair of pressure sections, and when that space is decreased, decreases the diameter of the front section of the outer column and creates a friction fit between the inner circumferential surface of the front section of the outer column and the outer circumferential surface of the rear section of the inner column; and
an energy absorbing member that is located between a portion that displaces in the forward direction together with the outer column during the secondary collision and a portion that does not displace in the forward direction during that secondary collision, the energy absorbing member being made of a member that plastically deforms as the outer column displaces in the forward direction during the secondary collision, and absorbs part of the impact energy through the relative movement of the plastic deformation.

Particularly in the impact absorbing steering apparatus of the present invention, part of the energy absorbing member is fastened to part of the portion that displaces in the forward direction together with the outer column, and plastic deformation of the member is restricted in the width direction by the pair of held wall sections of the outer column.

Preferably, the portion to which part of the energy absorbing member is fastened and that displaces in the forward direction together with the outer column is the tightening rod.

Preferably, the impact absorbing steering apparatus further comprises a cam member that fits around the middle section of the tightening rod, and when the tightening rod has been rotated in a direction that increases the diameter of the front section of the outer column, the cam member passes through the axial slit that is formed in the front section of the outer column and enters inside a locking hole that is formed in the rear section of the inner column.

In one aspect of the present invention, the energy absorbing member comprises: a base plate section; a pair of left and right band-shaped plate sections that are bent from the edges on both the left and right sides of the base plate section in the same direction in the vertical direction; a pair of energy absorbing sections that comprise U-shaped bent back sections that are formed on the band-shaped plate sections in the portions that protrude further toward the rear than the rear end edge of the base plate section, and are formed by bending the rear end sections in a direction toward each other; a pair of protruding sections that are provided in a state such that these protruding sections protrude in the vertical direction from the tip end section of these energy absorbing sections; a pair of third through holes that are formed in these protruding sections; and front end installation sections that are provided in the portion of the band-shaped plate sections that protrude further toward the front than the front end edge of the base plate section.

In this case, the band-Shaped plate sections are located along the inside surfaces of the held, wall sections, and by inserting the tightening rod through the third through holes, the rear section of the energy absorbing member is fastened to the tightening rod such that displacement in the forward direction together with the outer column during a secondary collision is possible, and by connecting the front end installation sections to a member to which the front end section of the inner column is fastened, the front section of the energy absorbing member is fastened to a portion that does not displace in the forward direction during the secondary collision.

Preferably, a member capable of adjusting the space between the tip end sections of the pair of energy absorbing sections is located between those tip end sections. In this case, the member capable of adjusting the space is a cam member that fits around the middle section of the tightening rod, and when the tightening rod is rotated in a direction that increases the diameter of the front section of the outer column, the cam member passes through the axial slit that is formed in the front section of the outer column, and enters inside the locking hole that is formed on the rear section of the inner column.

Preferably, the member to which the front end, section of the inner column is fastened is a housing in which the component parts of an electric-powered, steering apparatus are housed, the front end installation sections comprise protruding plate sections that are bent from the front end edge of the band-shaped plate sections in directions opposite from each other, and these protruding plate sections connect and fasten to the rear end surface of the housing.

In another aspect of the present invention, the energy absorbing member comprises: a base plate section; a third through hole that is provided in that base plate section; a bent back section having a U-shaped curved section that is provided in a state that protrudes toward the rear from the rear end edge of the base plate section; and a deforming plate section that extends toward the front from the tip end edge of the bent hack section. In this case, by inserting the tightening rod through the third through hole, the base plate section is fastened to the tightening rod so that displacement in the forward direction together with the outer column during a secondary collision is possible; the bent back section is located on the rear side of part of the portion that does not displace in the forward direction during the secondary collision, such that the bent back section and the part of the portion that does not displace engage during a secondary collision; and the deforming plate section is located along the inside surface of one of the held wall sections.

In this case, preferably, the part of the portion that does not displace in the forward direction during the secondary collision is a support pin, the base end section thereof is fastened to the outer circumferential surface of the portion toward the rear end of the inner column, and together with fitting in the axial slit, is prevented from coming apart from the axial slit toward the front of the outer column by a restraining section that is located on the front end edge section of the outer column.

Moreover, preferably, there is a cylindrical member that fits around the support pin such that the cylindrical member can rotate freely.

In the apparatus of the present invention, preferably, the first through holes are constructed as long holes in the forward/backward direction that are long in the axial direction of the outer column, the forward/backward position of the outer column can be adjusted within the range that the tightening rod can displace inside these first through holes, and by operating the adjustment lever that is located on the base end section of the tightening rod, the space between the pair of pressure sections is expanded or contracted, such that when the space is contracted, the diameter of the front section of the outer column is decreased, and fastens the forward/backward position of the outer column.

Furthermore, preferably the front end section of the inner column is supported by the vehicle body such that pivoting around a horizontal axis is possible; the second through holes are constructed long holes in the vertical direction that are long in the vertical direction and have a partial arc shape around the horizontal axis as a center; the vertical position of the steering wheel can be adjusted within the range that the tightening rod can displace inside the long holes in the vertical direction; when the adjustment lever that is located at the base end section of the tightening rod is operated, the space between the pair of pressure sections is increased or decreased; and when the space is decreased, the space between the pair of holding plate sections is decreased, causing a friction fit between the inside surface of these holding plate sections and the outside surface of the held wall sections, which fastens the vertical position of the outer column.

Preferably, in the apparatus of the present invention, a plurality of ribs that are long in the axial direction are formed around the outer circumferential surface of the inner column such that the outer circumferential surface of the inner column and the inner circumferential surface of the outer column come in contact at the apexes of these ribs.

Moreover, preferably, in the apparatus of the present invention, by forming a spline fit between male spline teeth that are formed around the outer circumferential surface on the end section of the inner shaft and female spline teeth that are formed around the inner circumferential surface on the end section of the outer shaft, extension and contraction is possible along the entire length of the spline shaft; and a coating layer of synthetic resin having a low friction coefficient is formed on the surface of at least one of the male spline teeth and female spline teeth.

Effect of the Invention

With the present invention, an impact absorbing steering apparatus is achieved that is capable of obtaining excellent performance at low cost, while maintaining freedom of design.

With the construction of the present invention, even when the tightening rod is located on the upper side or lower side of the outer column, the tightening rod and energy absorbing member can be arranged in series with each other in the axial direction of the outer column, so it is possible to prevent or reduce a moment in the pivot direction from being applied to the outer column during a secondary collision. As a result, it is possible to stabilize the friction it in the connection between the front section of the outer column and the rear section of the inner column, stabilize the sliding movement of that connection, and stabilize the absorption of impact energy during a secondary collision. Therefore, it is possible to improve the impact absorption performance without losing freedom of design.

In any of the aspects of the present invention, the energy absorbing member is located between the pair of held wall sections of the outer column, so the plastic deformation of the energy absorbing member due to an impact load being applied during a secondary collision is constrained and restricted by the held wall sections. Furthermore, the inside surfaces of the held wall sections extend in the axial direction along the steering column. When an impact load is applied to the outer column, the direction that this impact load is applied is the same as the direction of elongation of the inside surface of the held wall sections, so not only is the plastic deformation of the energy absorbing member restricted, but the portion that is waiting to absorb the impact energy, or in other words, the energy absorbing section or deforming plate section is also constrained, so it is possible to even further stabilize the absorption of impact energy by the energy absorbing member.

Moreover, in order to absorb impact energy during a secondary collision, not only friction resistance in the area of engagement between the inner circumferential surface of the front section of the outer column and the outer circumferential surface of the rear section of the inner column, but plastic deformation of the energy absorbing member is also used, so it becomes easy to stabilize the performance of absorbing the impact energy, and it also becomes possible to tune the absorption capability. For example, in construction comprising a pair of energy absorbing sections that have U-shaped bent back sections, an adjustable member is provided between the tip ends sections, for example, a cam member that fits around the middle section of the tightening rod, and by arbitrarily changing the width of the cam member, it is possible to adjust the radius of curvature of the bent back sections, and thus it is possible to easily tune the absorption capability of the energy absorbing member.

In any of the aspects of the present invention, part of the energy absorbing member can be fastened to and supported by the tightening rod that is originally installed in the steering apparatus. Moreover, in construction where the front end section of the energy absorbing member is supported by the housing for an electric-powered, steering apparatus, or in construction where part of the energy absorbing member is fastened by a support pin, these members are also originally installed in the steering apparatus. Therefore, there is no need to install new member for installing the energy absorbing member, so in the present invention, it is possible to keep the cost associated with installing this energy absorbing member from rising.

This tightening rod is supported by the long holes in the forward/backward direction that are formed on the held wall sections of the outer column, and is repeatedly used in operation of both a tilting mechanism and telescoping mechanism, so in order that the tightening rod can withstand such repeated use, the tightening rod is hardened by heat treatment, and also has good bending strength. The construction for absorbing impact energy of the present invention uses this tightening rod, so from that point as well, it is possible to stabilize and suppress unevenness in the absorption of impact energy.

Moreover, in construction where the front end section of the energy absorbing member is supported by the housing for an electric-powered steering apparatus, this energy absorbing member is fastened to a housing that is made of a rigid body that is obtained by die casting an aluminum alloy, so similarly it is possible to stabilize and suppress unevenness in the absorption of impact energy.

Furthermore, when construction is employed that comprises a base plate section and a pair of band-shaped plate sections that stand from the edges on both the left and right sides of this base plate section as the energy absorbing member, the base plate section along the width direction of the energy absorbing member, so when an impact load is applied, it is possible to prevent deformation of this energy absorbing member. From this aspect as well, it can be said that the construction of the present invention contributes to stabilizing and suppressing unevenness in the absorption of impact energy.

BRIEF DESCRIPTION OF THE DRAWINGS

FIG. 7A is a perspective view illustrating the state as seen from the upper front, and FIG. 7B is a perspective view illustrating the state as seen from the lower front.

FIG. 11A illustrates the normal state, and FIG. 11B illustrates the state after a secondary collision.

FIG. 17A is a perspective view illustrating the state as seen from the upper front, and FIG. 17B is a perspective view illustrating the state as seen from the lower front.

FIG. 23A is a partial side view, and FIG. 23B is a cross-sectional view of section e-e.

FIG. 24A illustrates the normal state, and FIG. 24B illustrates the state after a secondary collision.

DESCRIPTION OF EMBODIMENTS OF THE PRESENT INVENTION

[Embodiment 1]

Figure 1:
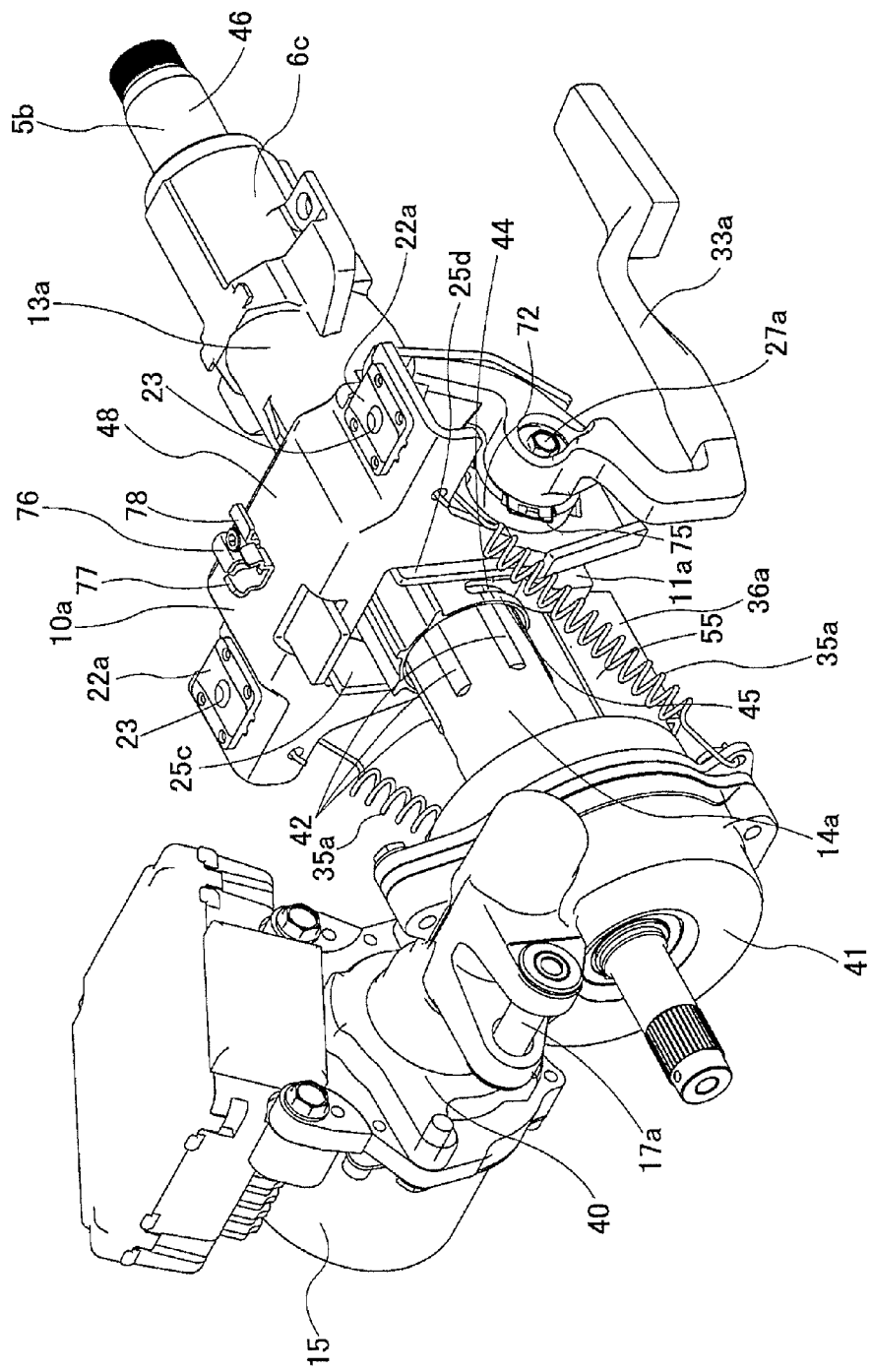
FIG. 1 is a perspective drawing illustrating the normal state of a steering apparatus of an example of a first embodiment of the present invention as seen from the upper front.

An example of a first embodiment of the present invention will be explained with reference to FIG. 1 to FIG. 9. The impact absorbing steering apparatus of this embodiment comprises: an inner column 14a, an outer column 13a, a steering shaft 5b, a pair of held wall sections 11a, a pair of long holes 28 in the forward/backward direction, a support bracket 10a, a pair of long holes 26a, 26b in the vertical direction, a tightening rod 27a, a cam unit 32a as a fastening means, and an energy absorbing member 36a. In the definition of the present invention, the long holes 28 in the forward/backward direction correspond to first through holes, and the long holes in the vertical direction correspond to second through holes. The shape of these first through holes and second through holes can be changed depending on whether or not the steering apparatus comprises a telescoping mechanism and/or tilting mechanism. In construction that does not comprise these mechanisms, one or both of the first through holes and second through holes can be simple circles.

The inner column 14a, in a state wherein the forward/backward position is regulated, or in other words, in a state where there is no forward displacement even during a secondary collision, is located further toward the front side than the outer column 13a. More specifically, the front end section of the inner column 14a is connected and fastened to the rear end section of a housing 41 that houses components such as the reduction gear of an electric powered steering apparatus 40. This housing 41 is formed by die casting an aluminum alloy for example, and has a though hole for inserting the front end section of the steering shaft 5b formed in the rear wall section. Moreover, a cylindrical wall section that protrudes toward the rear is formed on the edge section around this through hole. The front end section of the inner column 14a is connected and fastened to the housing 41 by fitting tightly around this cylindrical wall section, with the edge of the front end coming in contact with the rear wall section. The inner column 14a is an overall cylindrical shape, and a plurality of ribs 42 that are long in the axial direction (preferably an even number, there are six in the example in the figure) are formed around the outer circumferential surface, except for the portion on the front end section, such that they are evenly spaced in the circumferential direction.

The outer column 13a is formed as a single piece by die casting of an aluminum alloy for example. The front section of this outer column 13a fits around the rear section of the inner column 14a to form a steering column 6c that can extend and contract. In the case of this embodiment, the inner circumferential surface of the outei column 13a and the outer circumferential surface of the inner column 14a come in contact with each other by the apex sections of the ribs 42. In this state, it is possible to adjust and fasten the forward/backward position of the outer column 13a with respect to the inner column 14a. In order for this, a slit 43 in the axial direction is provided on the front section of the outer column 13a, which is the section that fits with the inner column 14a, and this slit 43 makes it possible for the diameter of this front section to expand or contract elastically in this construction, the ribs provided on the inner column 14a have a constant protruding shape in the axial direction, so the area of contact between the outer circumferential surface of the inner column 14a and the inner circumferential surface of the outer column 13a become linear contact. With this construction, the sliding friction between the outer column 13a and the inner column 14a is reduced, and there is little change in the contact surface, so when an impact load is applied to the outer column 13a, it is possible to suppress fluctuation in the absorption of impact energy by this contact. Moreover, when the outer column is tightened and the diameter reduced, there is a little deformation in the shape, so mutual rotation between the outer column 13a and inner column 14a is prevented, and thus the position of the axial slit 43 in the outer column is stable.

In the construction of this example, a slit 44 in the circumferential direction is formed in the portion near the front end of the outer column 13a, except in the portion on the top end in the circumferential direction, and the portion between this slit 44 in the circumferential direction and the edge on the front end of the outer column 13a functions as a closed ring section 45 that is continuous around the entire circumference. In this invention, in the construction where a support pin 63 is provided in the inner column 14a, this closed ring section 45 functions as a retaining section. The diameter of the front section of the outer column 13a in the portion further to the rear than the circumferential slit 44 is able to expand or constrict elastically. The front section of the outer column 13a, whose diameter is able to expand and constrict in this way, fits around the rear section of the inner column 14a, and based on the displacement in the axial direction with respect to the inner column 14a, the forward/backward position can be adjusted.

By forming a spline fit between female spline teeth that are formed around the inner circumferential surface on the front half section of the outer shaft 46, which forms the rear half of the steering shaft 5b, and male spline teeth that are formed around the outer circumferential surface of the rear half of the inner shaft 47, which forms the front half of the steering shaft 5b, the steering shaft 5b is formed such that the entire length can be extended or contracted. A synthetic resin coating layer made of a synthetic resin having a low friction coefficient, such as polyimide resin (nylon), polytetrafluoroethylene resin (PTFE), polyacetal resin and the like, is formed on the surface of at least one set of teeth of the male spline teeth and female spline teeth. Therefore, the outer shaft 46 and inner shaft 47 are fitted together such that they are able to transmit torque, and are able to extend or contract under a light force. With this construction, the sliding friction between the outer shaft 46 and the inner shaft 47 is reduced. This kind of steering shaft 5b is supported on the inner diameter side of the steering column 6c such that it can rotate freely. More specifically, the portion near the rear end in the center section of the outer shaft 46 is supported by a rolling bearing, such as a single-row deep groove ball bearing that can support both a radial load and an axial load, so that it can rotate freely. Therefore, the outer shaft 46 moves as the outer column moves in the axial direction of the outer column 13a, and the steering shaft 5b extends or contracts.

The pair of held wall sections 11a is provided on the bottom surface of the front section of the outer column 13a on both the left and right sides of the axial slit 43, and is integrated with the outer column 13a. At a position where these held wall sections 11a are aligned with each other, the long holes 28 in the forward/backward direction are formed in the axial direction of the outer column 13a. In the example in the figure, the axial slit 43 and held wall sections ha are provided on the lower side of the outer column 13a, and the tightening rod 27 and fastening unit for expanding or constricting the front section of the outer column 13a are arranged on the lower side of the outer column 13a, however, the present invention is not limited to this form, and the invention can also be applied to construction in which the axial slit and held wall sections are provided on the upper side of the outer column, and the tightening rod and fastening unit for expanding or contracting the front section of the outer column are provided on the upper side of the outer column.

The support bracket 10a has a pair of left and right holding plate sections 25c, 25d and an installation plate section 48. The holding plate sections 25c, 25d and the installation plate section 48 are all formed by pressing a metal plate such as a carbon steel plate having sufficient strength and rigidity, and are connected and fastened together by a method such as welding. The holding plate sections 25c, 25d hold the held wall sections ha that are provided on the bottom surface of the outer column 13a (the top surface in construction in which there is an axial slit on the upper side of the outer column) on both the left and right sides. The installation plate section 48 supports the outer column 13a with respect to the vehicle body by way of these held wall sections 11a, and during a secondary collision, allows the outer column 13a to displace in the forward direction. In order for this, as in the conventional construction illustrated in FIG. 19 to FIG. 22, capsules 22a are installed in a pair of cutout sections 21a that are formed in the left and right end sections of the installation plate section 48 such that the capsules can drop due to an impact load that is applied dining a secondary collision.

Figure 18:
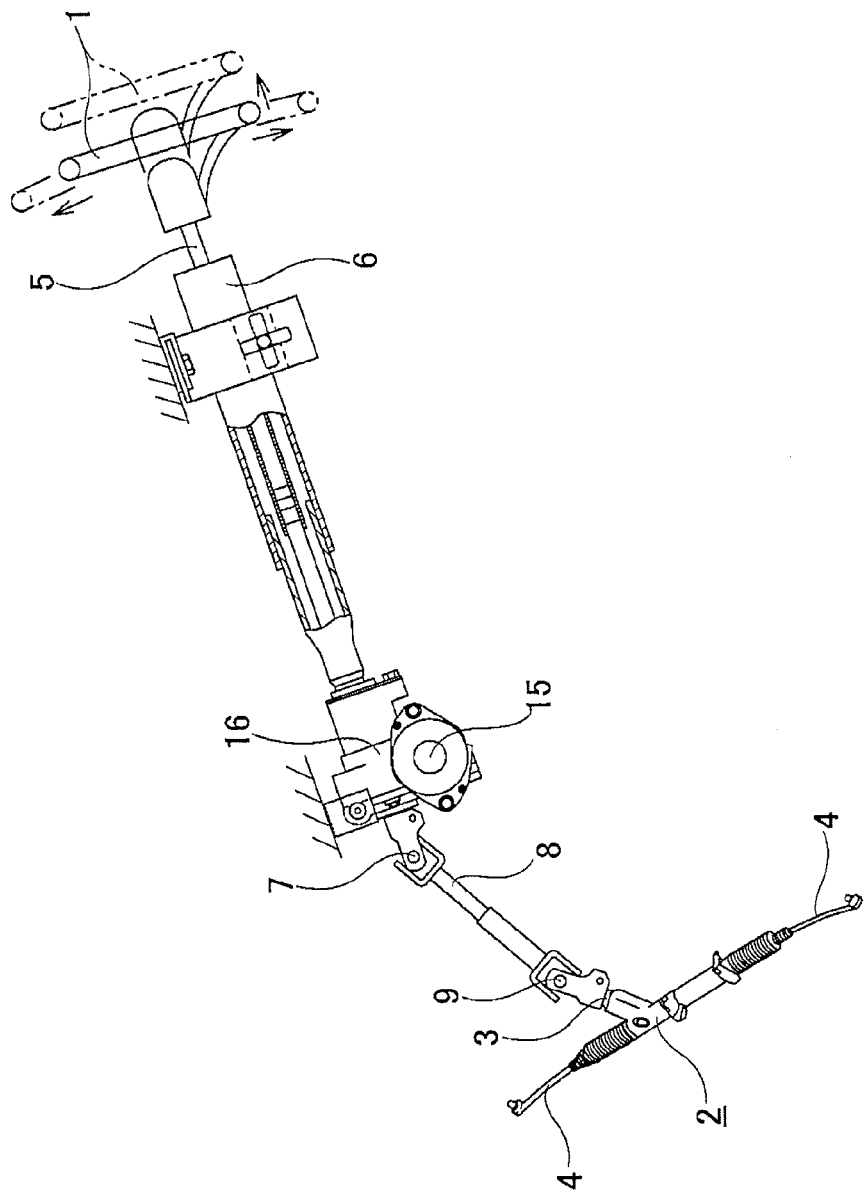
FIG. 18 is a partial cross-sectional side view illustrating an example of a conventional steering apparatus.
Figure 19:
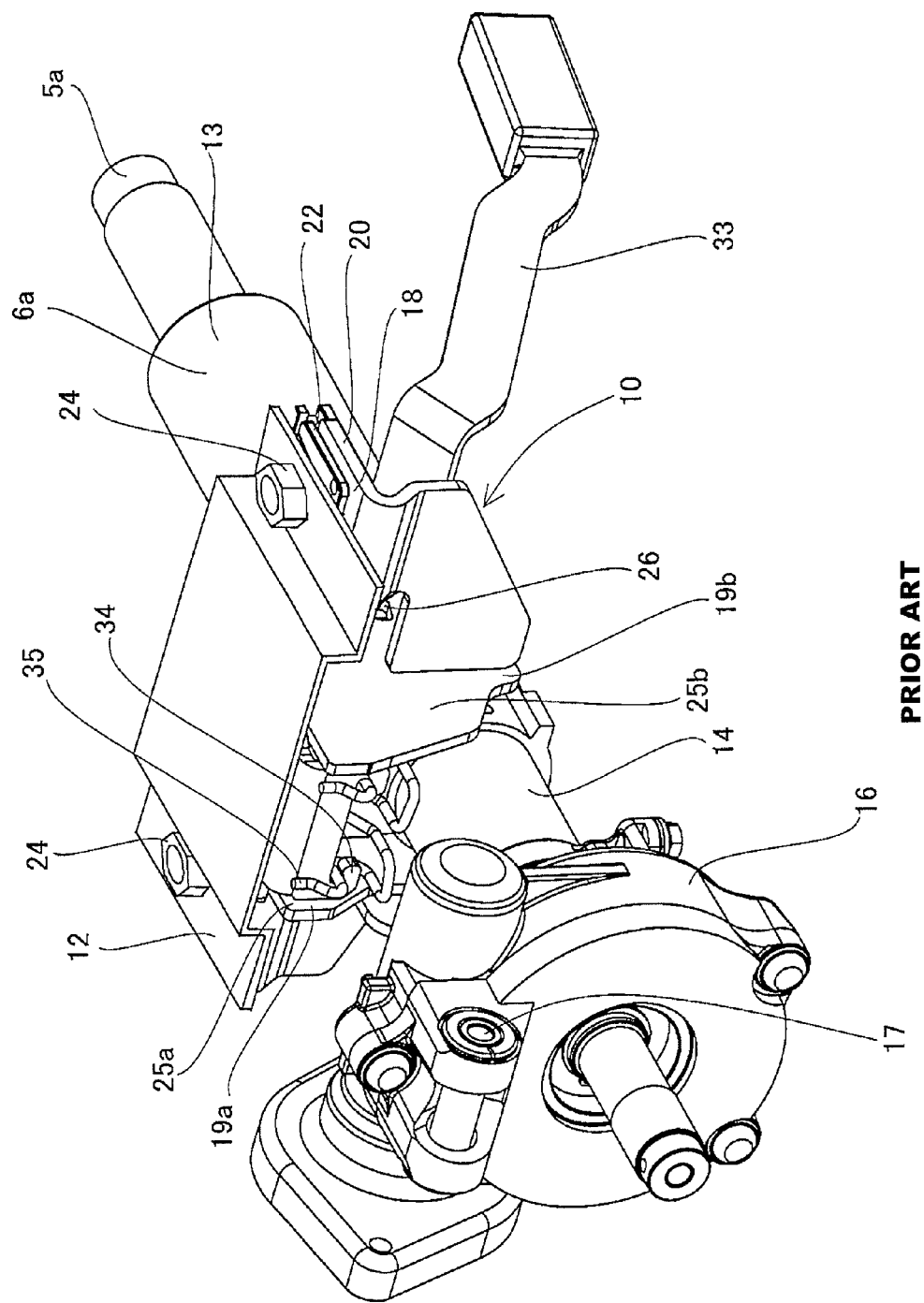
FIG. 19 is a perspective view of an example of a conventional impact absorbing steering apparatus, and illustrates the state as seen from the upper front.
Figure 20:
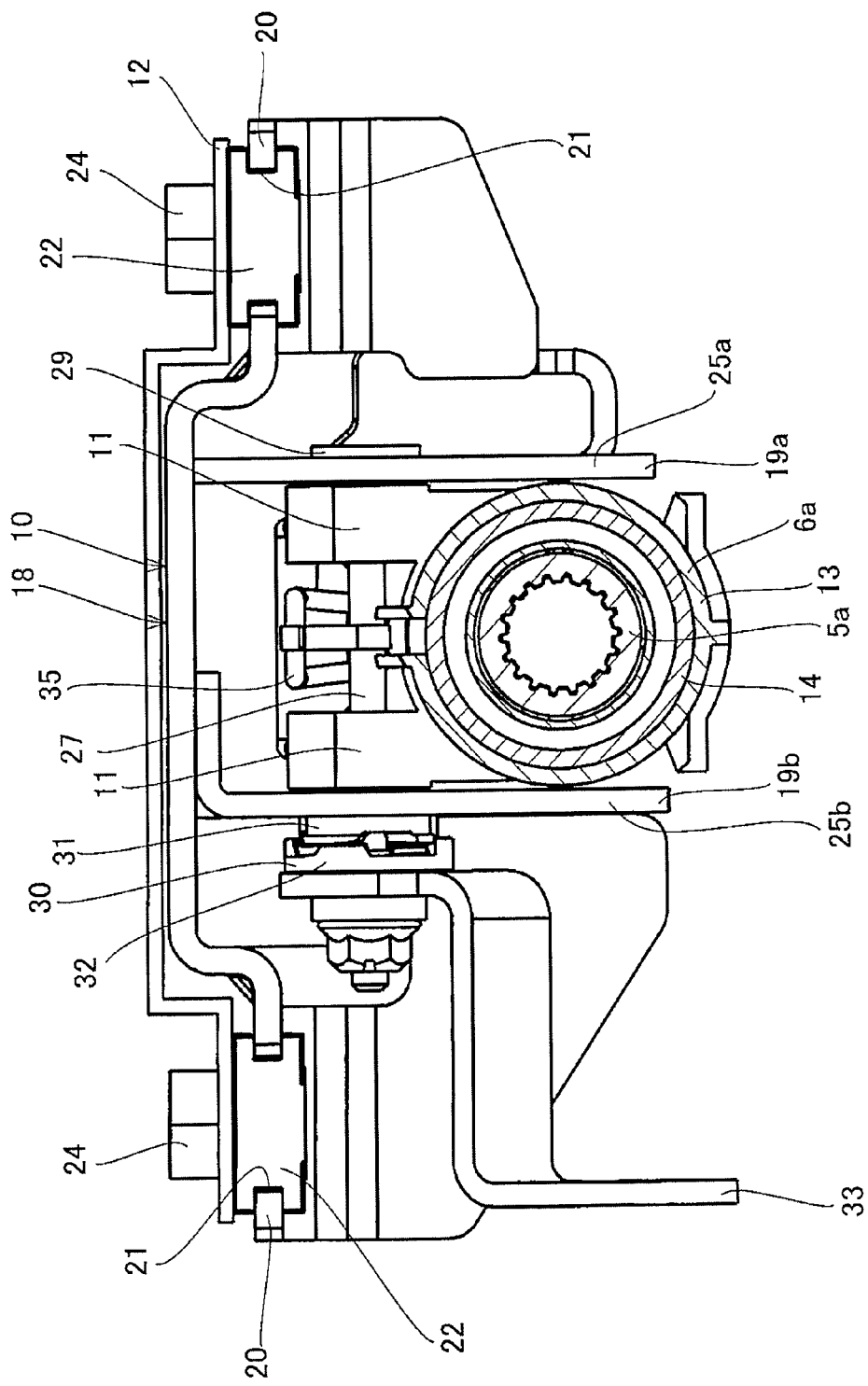
FIG. 20 is a cross-sectional view of the steering apparatus in FIG. 19.
Figure 21:
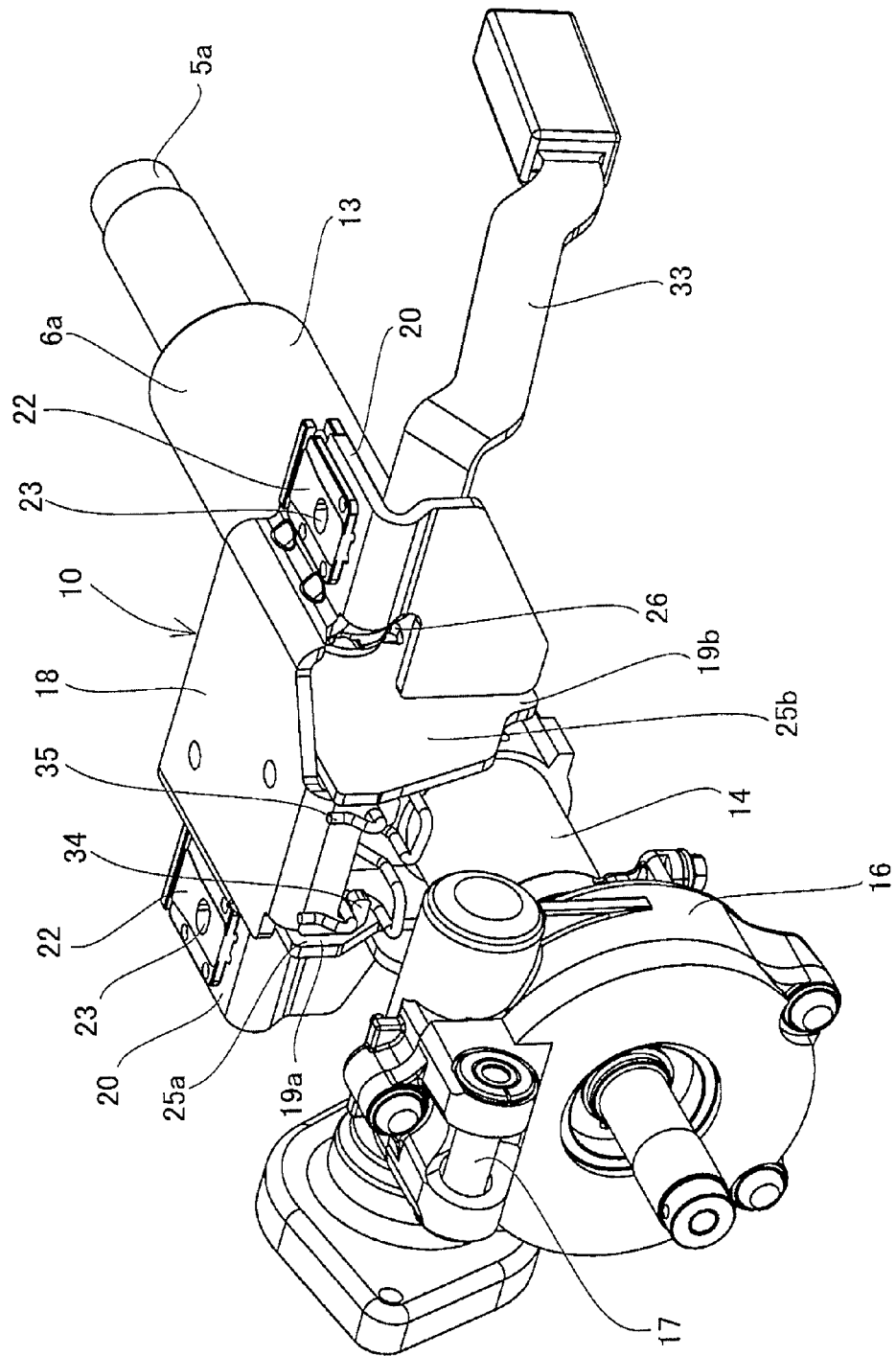
FIG. 21 is a perspective view similar to the perspective view of the steering apparatus in FIG. 19 with the bracket on the vehicle side omitted.
Figure 22:
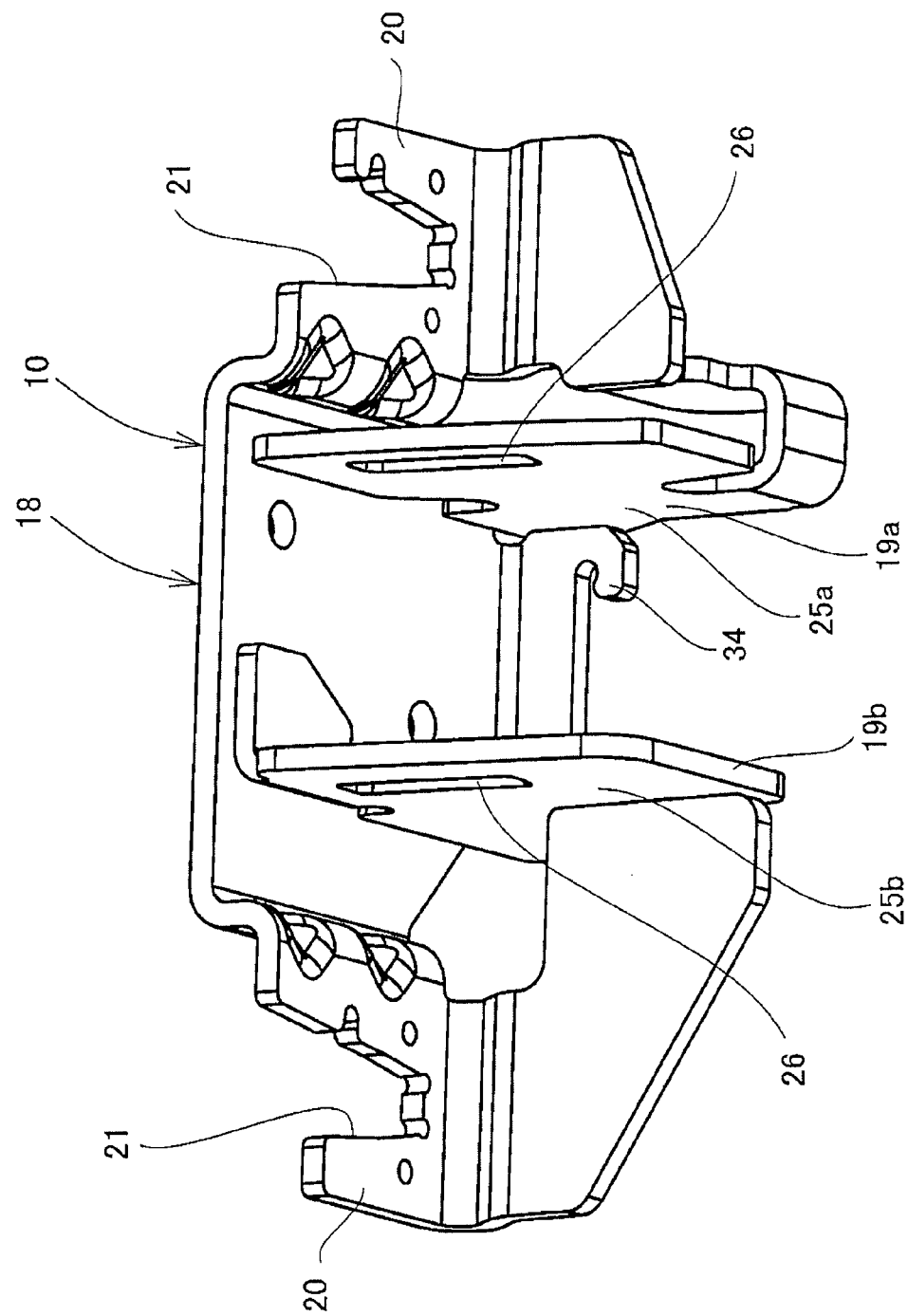
FIG. 22 is a perspective view of the support bracket of the steering apparatus in FIG. 19, and, illustrates the state as seen from the lower rear.
Figure 23A:
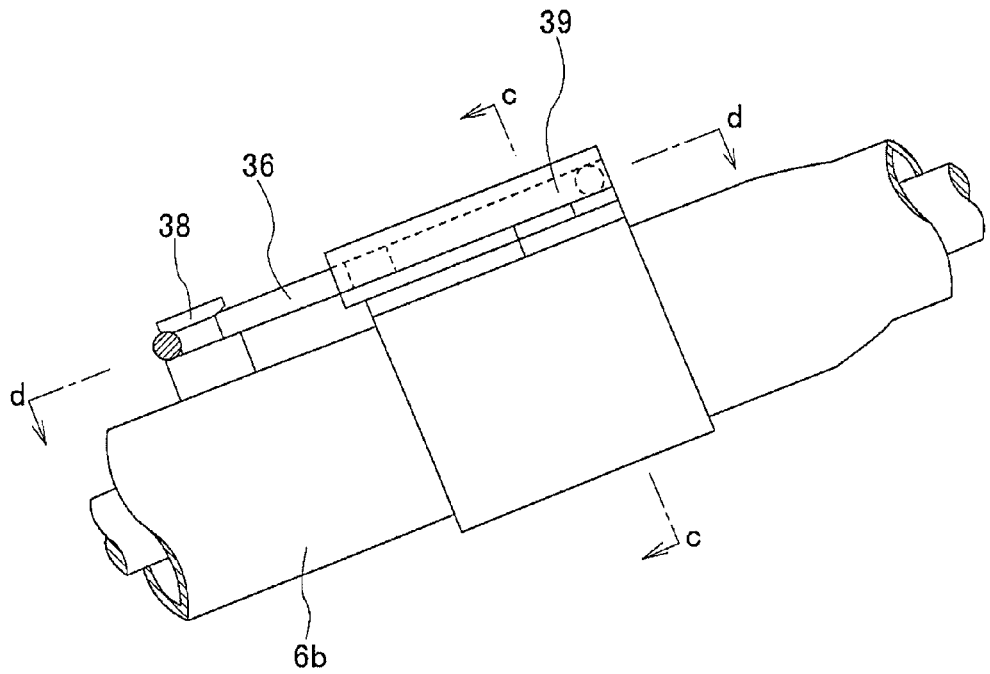
FIGS. 23A and 23B are partial cross-sectional views of the steering column section of an impact absorbing steering apparatus in which a conventional energy absorbing member is installed, where
Figure 23B:
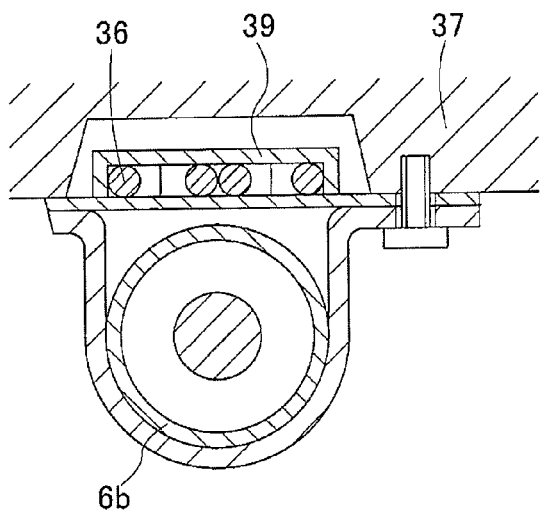
Figure 24A:
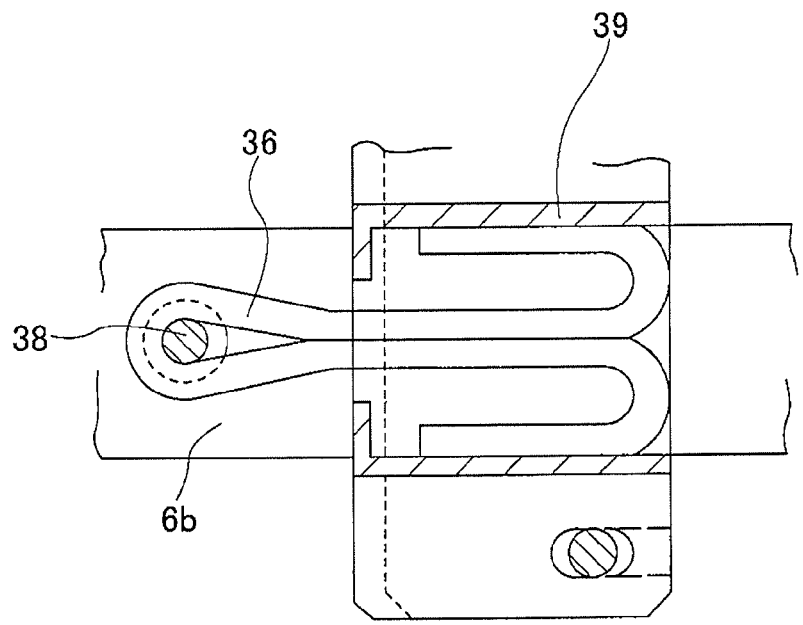
FIGS. 24A and 24B are cross-sectional views of section f-f in FIG. 23A of the steering column section of the steering apparatus in FIGS. 23A,B, where
Figure 24B:
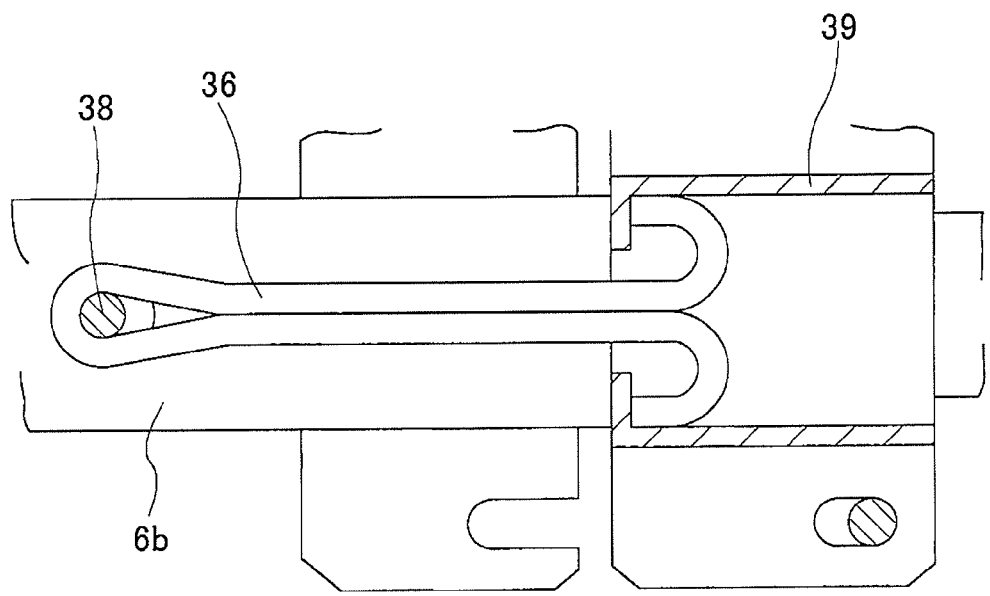

The long holes 26a, 26b in the vertical direction are formed in a partial arc shape around the center axis of the support pipe 17a that is provided in the front upper portion of the housing 41 and functions as a horizontal axis in the present invention, and are formed in the portion of the holding plate sections 25c, 25d that are aligned with part in the length direction of the long holes 28 in the forward/backward direction. The tightening rod 27a is inserted through the long holes 28 in the forward/backward direction and the long holes 26a, 26b in the vertical direction. On the portion near the tip end side of the center section of the tightening rod 27a (portion near the right in FIG. 4 and FIG. 6), in order from the side near the center of the tightening rod 27a, a tilt spacer 49, spacer 50, washer 51 and thrust bearing 52 are fitted around the tightening rod 27a. By screwing a nut 53 onto the tip end section of this tightening rod 27a, these members 49 to 52 are prevented from coming apart from the tightening rod 27a. By performing crimping deformation of any part of the nut 53 after being screwed onto the necessary location, the nut 53 is prevented from coming loose. The members 49 to 52 are provided in order that when adjusting the position of the steering wheel 1 (FIG. 18), displacement of the tightening rod 27a and displacement of the tip end section of the tightening rod 27a along the long hole 26a in the vertical direction can be performed smoothly.

On the other hand, a cam unit 32a that comprises a drive cam 30a and a driven cam 31a is provided on the base end section of the tightening rod 27a. In this example, the driven cam 31a and the nut 53 form a pair of pressure units in the present invention. In the cam unit 32a, the adjustment lever 33a rotates and drives the drive cam 30a, and the distance between the driven cam 31a and nut 53 can be increased or decreased. The driven cam 31a engages to the long hole 26b in the vertical direction from the outside surface side of the holding plate 25d, in a state where the displacement (raising or lowering) along this long hole 26b in the vertical direction is possible, but the rotation therein is prevented. When adjusting the position of the steering wheel 1, by rotating the adjustment lever 33a in the downward direction, the distance between the driven cam 31a and the nut 53 is increased. As a result of this distance increasing, the contact pressure between the surface on the inside of the holding plate sections 25c, 25d and the surfaces on both the left and right sides of the outer column 13a, including the held wall sections 11a, decreases or is lost. At the same time, the diameter of the front section of the outer column 13a is elastically expanded, and the contact pressure between the inner circumferential surface of the front section of the outer column 13a, and the outer circumferential surface of the rear section of the inner column 14a decreases.

In this state, the outer column 13a is displaced within the range that the tightening rod 27a can displace inside the long holes 26a, 26b in the vertical direction and the long holes 28 in the forward/backward direction. The position of the steering wheel 1 that is supported by and fastened to the rear end, section of the outer shaft 46 that is supported inside the outer column 13a such that it rotates freely, or in other words, at least one of the position of the steering wheel 1 in the forward/backward direction and the position in the vertical direction is adjusted. While the work of adjustment is performed, the weight of the portion that moves up and down with the outer column 13a is supported by a pair of equalizer springs 35a, which are tension springs, that are provided between the housing 41 and the installation plate section 48 of the support bracket 10a. Therefore, it is not necessary for the driver to carry the entire weight of this portion when adjusting the position of the steering wheel 1. After the steering wheel 1 has been moved to a desired position, the adjustment lever 33a is rotated upward, which decreases the distance between the driven cam 31a and the nut 53. As a result, the contact pressure between the inside surfaces of the holding plates 25d, 25d and the left and right; side surfaces of the outer column 13a, and the contact pressure between the inner circumferential surface on the front section of the outer column 13a and the outer circumferential surface on the rear section of the inner column 14a increase, and the position of the outer column 13a is fastened in the desired position.

Figure 7A:
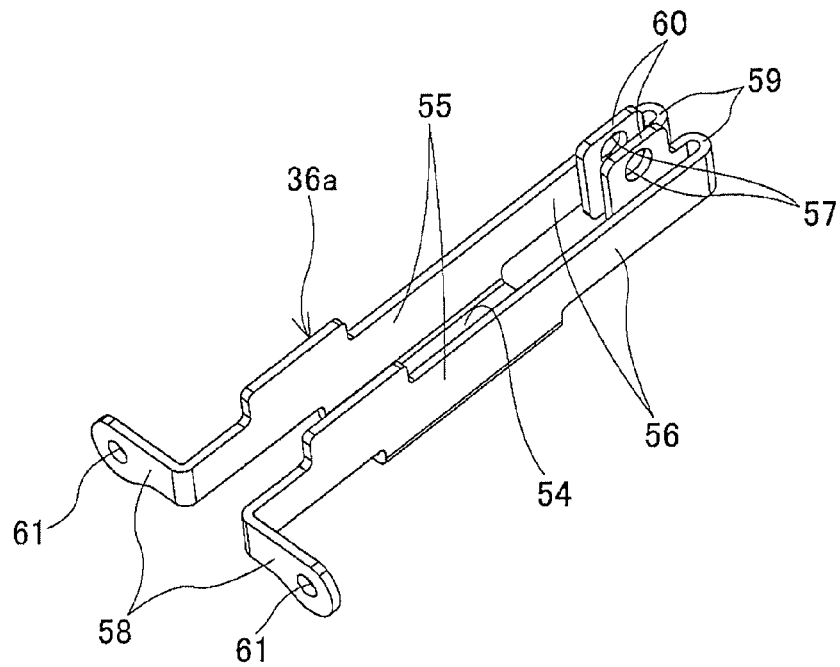
FIGS. 7A and 7B are perspective views illustrating an energy absorbing member of the steering apparatus in FIG. 1, where
Figure 7B:
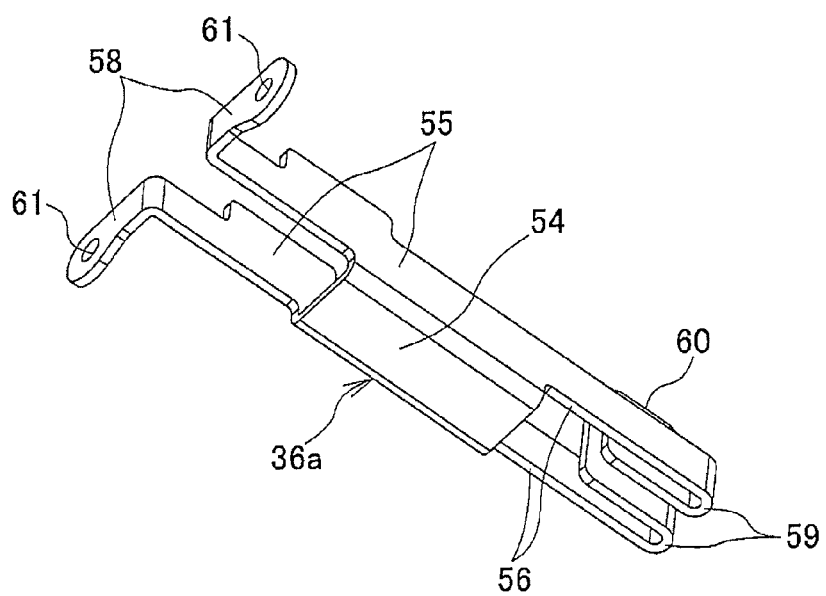

Furthermore, the energy absorbing member 36a, which is a unique feature of this example, is provided between the middle section in the axial direction of the tightening rod 27a, which is the portion that displaces in the forward direction together with the outer column 13a during a secondary collision, and the rear end surface of the housing 41 of the electric powered steering apparatus 40. The energy absorbing member 36a is formed as a single piece as illustrated in FIGS. 7A, 7B by punching and bending in a pressing process of metal plate such as soft steel plate that has sufficient strength and rigidity for absorbing impact energy, as well as can be plastically deformed. The following explanation is based on the construction of this example, however, as in the conventional construction illustrated in FIG. 19 to FIG. 24, in construction where the tightening rod and fastening unit are located above the steering column, the positional relationship in the vertical direction of the members is reversed in the explanation below.

More specifically, the energy absorbing member 36a comprises a base plate section 54, a pair of left and right band-shaped-plate sections 55, a pair of left and right energy absorbing sections 56, circular through holes 57 and a pair of left and right front installation sections 58. In the definition of the present invention, the through holes 57 correspond to third through holes.

Figure 2:
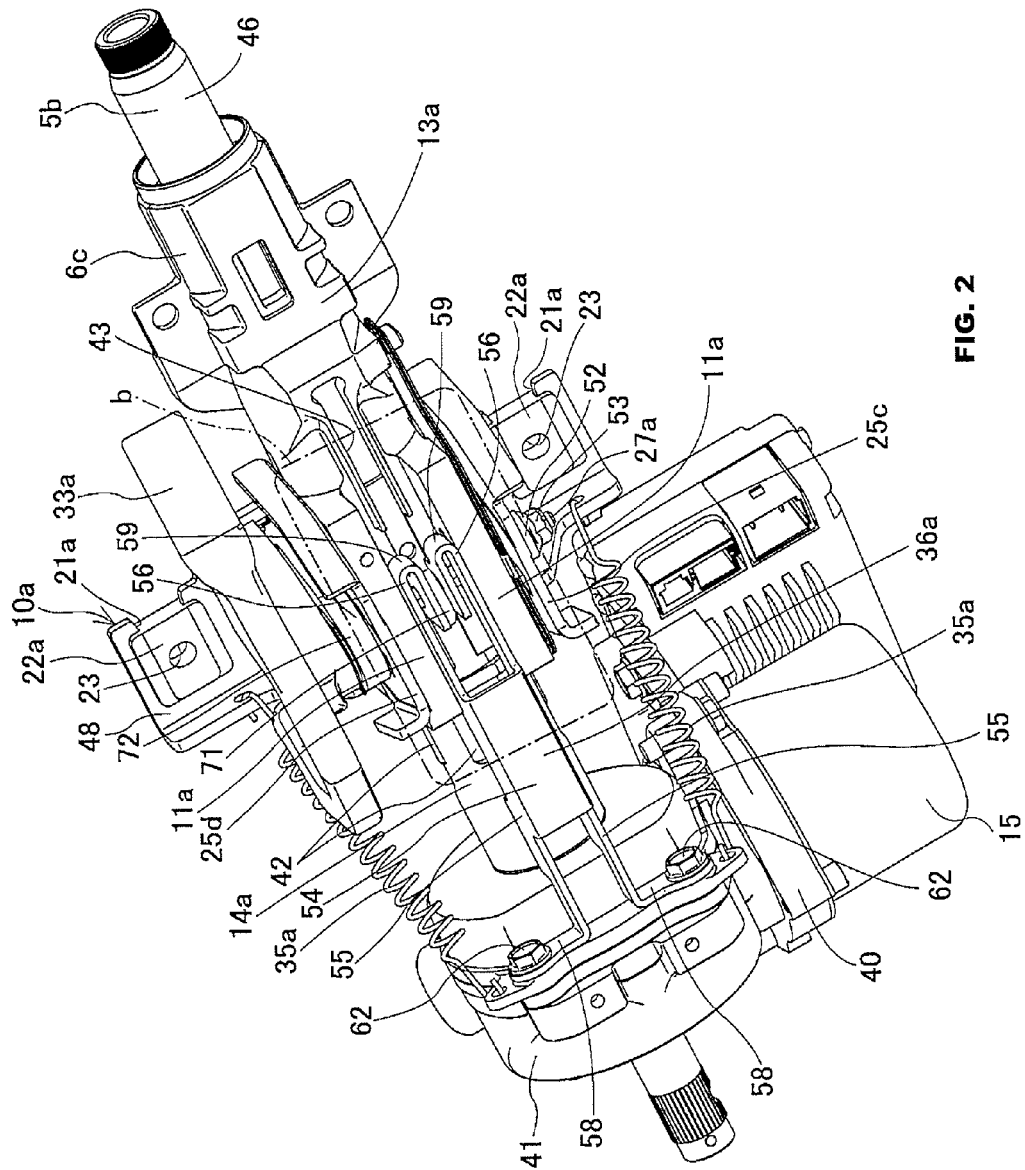
FIG. 2 is a perspective drawing illustrating the normal state of the steering apparatus in FIG. 1 as seen from the lower rear.
Figure 3:
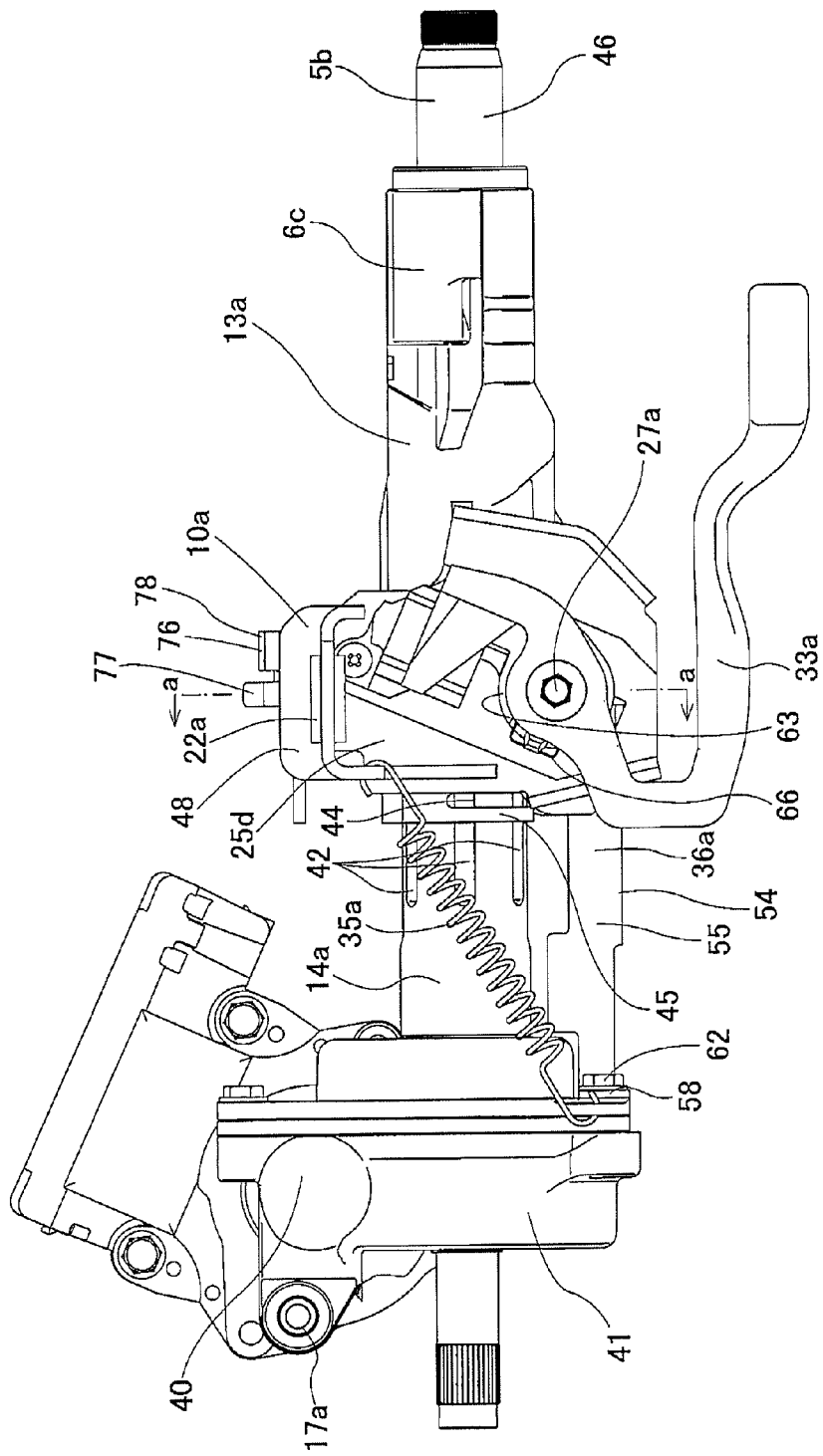
FIG. 3 is a side view of the normal state of the steering apparatus in FIG. 1.
Figure 4:
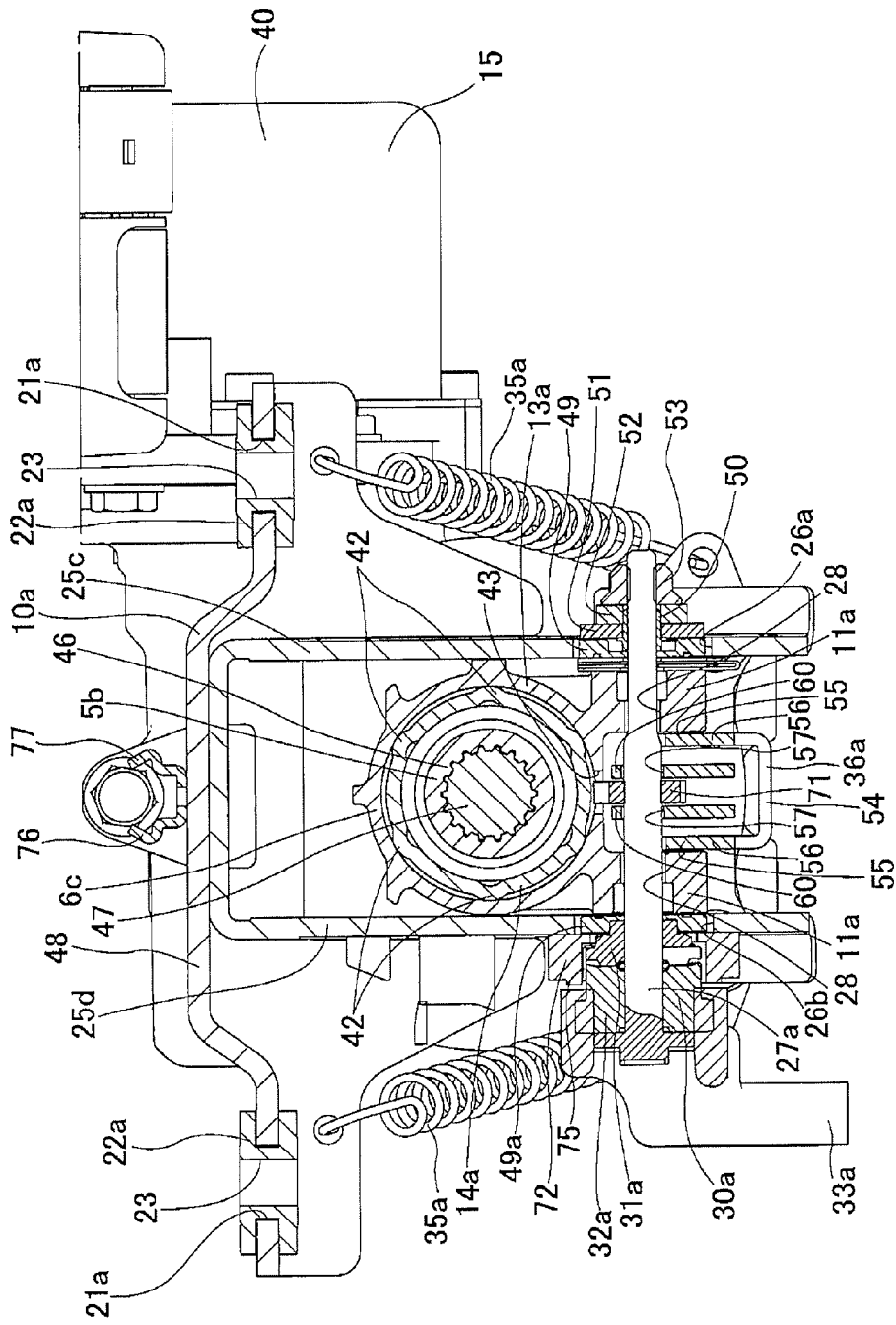
FIG. 4 is a cross-sectional view of section a-a in FIG. 3.
Figure 5:
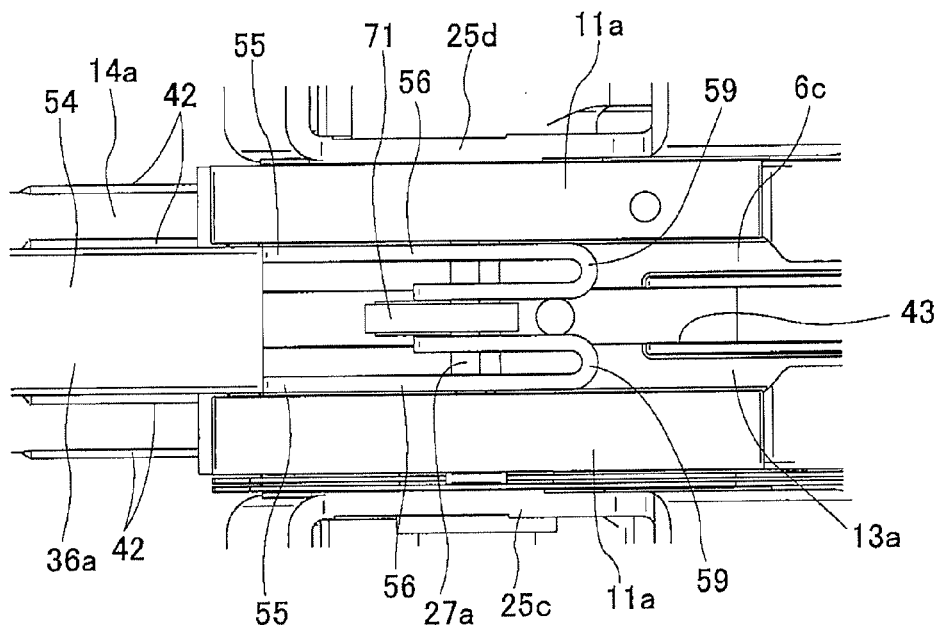
FIG. 5 is an orthographic projection illustrating the state as seen the bottom, and is an enlarged view of area b in FIG. 2.
Figure 6:
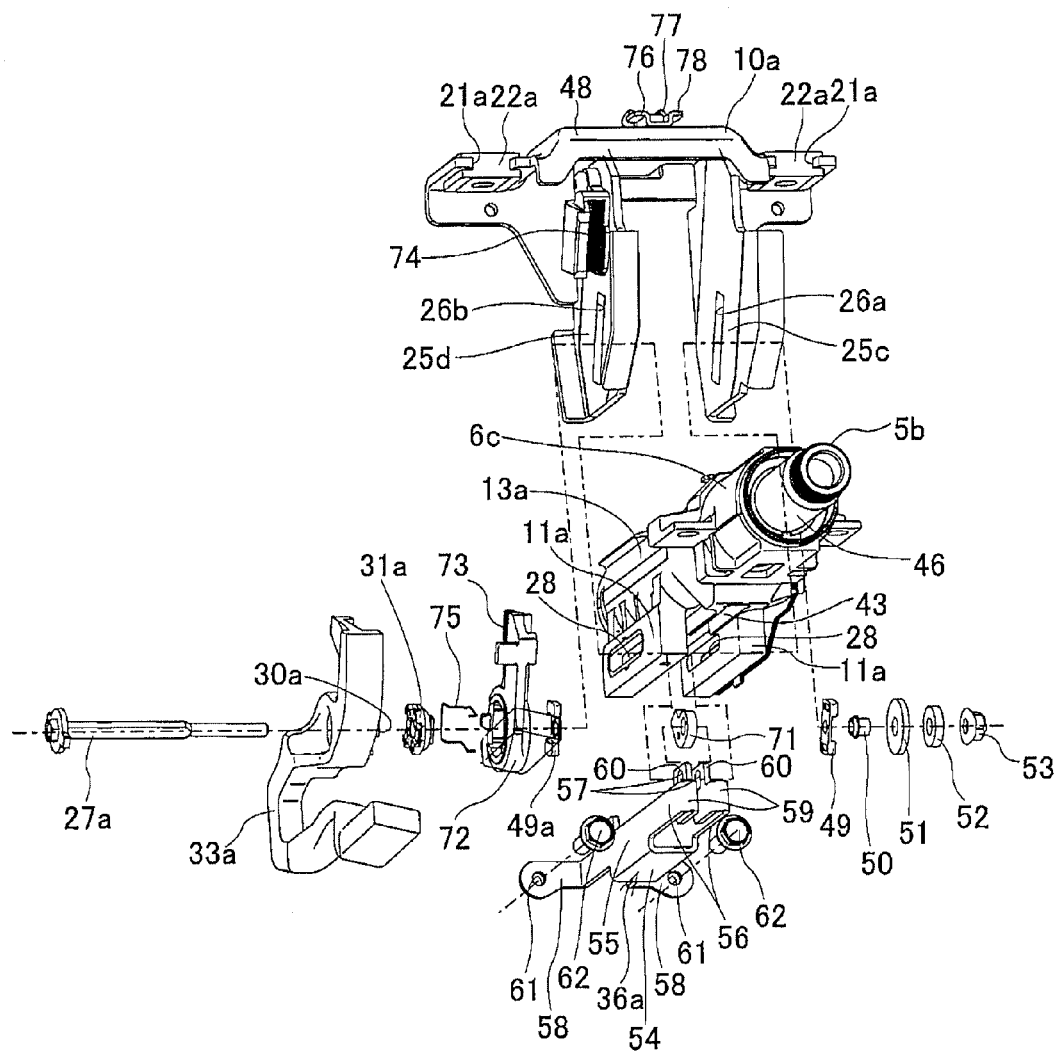
FIG. 6 is an exploded perspective view illustrating the state as seen from the lower rear, of the mechanism portion for adjusting the forward/backward position and vertical position of the outer column of the steering apparatus in FIG. 1.

The band-shaped plate sections 55 are bent upward from the edges on both the left and right edges of the base plate section (downward in construction where there is a slit on the upper side of the outer column), such that they are parallel with each other and at right angles with respect to the base plate section 54. The energy absorbing sections 56 comprise U-shaped bent back sections 59 that are a portion of the band-shaped plate sections 55 that protrudes toward the rear further than the edge on the rear end of the base plate section 54, and are formed by bending the rear end sections of the band-shaped plate sections 55 in a direction toward each other. The through holes 57 are formed in a pair of protruding sections 60 that are provided, on the edges of the ends of these bent back sections 59 and protrude upward (or downward) from the tip end sections of the energy absorbing sections 56. Therefore, the through holes 57, when the energy absorbing member 36a is seen from the side, are not covered by the other parts of the energy absorbing sections 56, and are exposed to the side. Furthermore, the front end installation sections 58 are provided on the front end sections of the band-shaped plate sections 55 by bending the portion of the base plate section 54 that protrudes further toward the front than the front edge and that are aligned in the forward/backward direction, in opposite directions from each other such that they are at right angles with the band-shaped plate sections 55. Installation holes 61 are formed in each of the tip end sections of the front end installation sections 58. As illustrated in FIG. 2, this kind of energy absorbing member 36a is installed between the rear end surface of the housing 41 and the tightening rod 27a. In other words, the energy absorbing sections 56 of the band-shaped plate sections 55 are placed along the inside surface of the pair of held wall sections 11a that are provided on the outer column 13a side and face with each other. In this state, the tightening rod 27a is inserted through the through holes 57, connecting the rear section of the energy absorbing member 36a to the outer column 13a via the tightening rod 27a. Therefore, the rear section of the energy absorbing member 36a displaces in the forward direction together with the outer column 13a during a secondary collision. In regards to this, the bolts 62 that are inserted through the installation holes 61 of the front end installation sections 58 screw into screw holes that are opened in the rear end surface of the housing 41, and by tightening the bolts 62, the front section of the energy absorbing member 36a is connected to and fastened to the housing 41.

Figure 8:
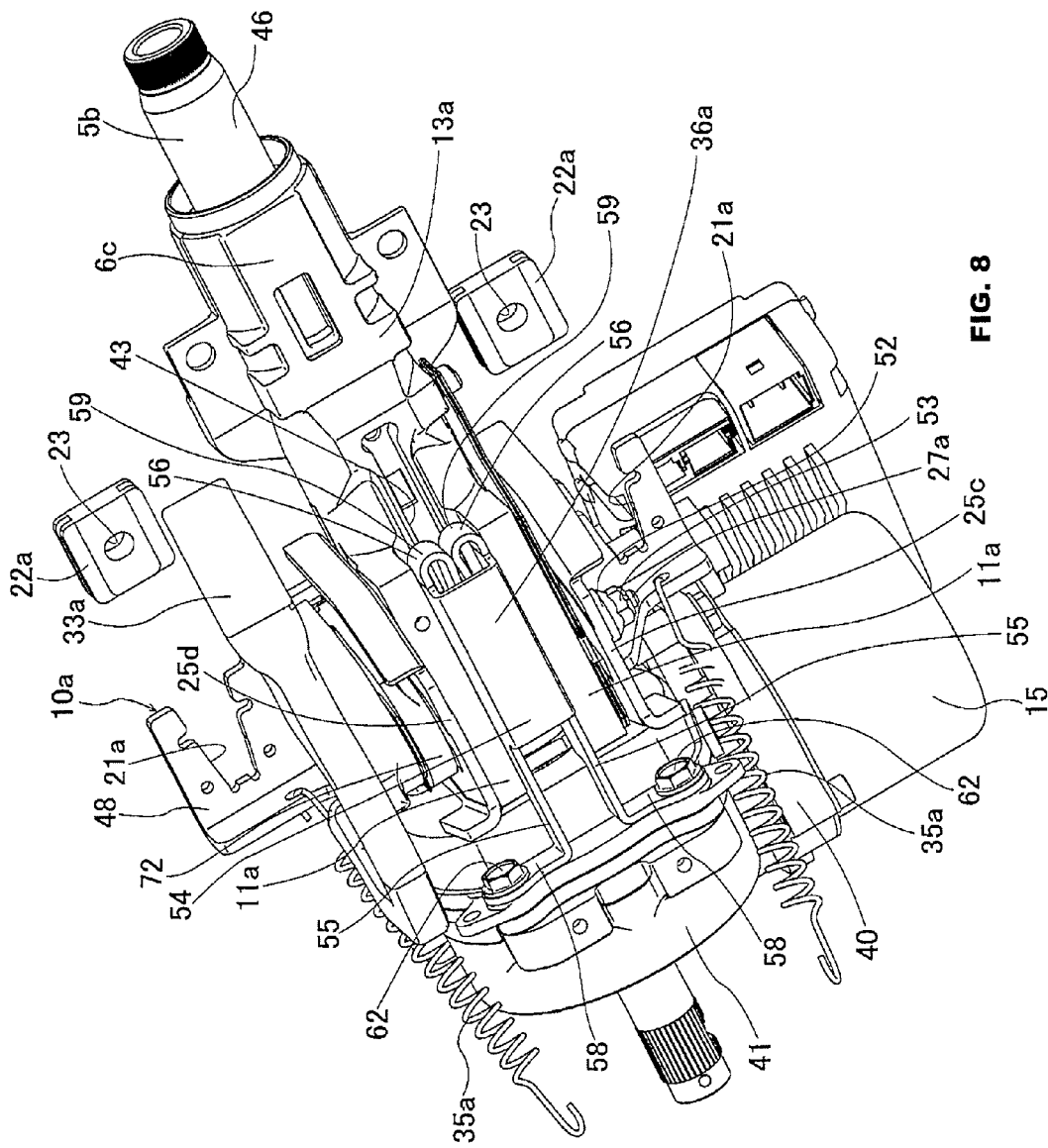
FIG. 8 is a perspective view of the steering apparatus in FIG. 1 similar to FIG. 2, and illustrates the state after a secondary collision occurs.

Comprising construction as described above, the energy absorbing member 36a that is installed between the tightening rod 27a and the housing 41 plastically deforms from the state illustrated in FIG. 2 to the state illustrated in FIG. 8 when a secondary collision occurs. In other words, as the outer column 13a displaces in the forward direction when a secondary collision occurs, the energy absorbing sections 56 are caused to plastically deform in a direction that moves the bent back sections 59 in the forward direction, which allows the tightening rod 27a to displace in the forward direction. When this occurs, due to the plastic deformation, impact energy that is transmitted from the steering wheel 1 to the tightening rod 27a by way of the outer shaft 44 and outer column 13a is absorbed. In this case, the outside of the energy absorbing sections 56 are partitioned by held wall sections 11a, and the held wall sections 11a are made from a rigid body that is formed by die casting of an aluminum alloy, so plastic deformation of the energy absorbing sections 56 is performed stably without the energy absorbing sections 56 deforming in the expanding direction to the left and right. When absorbing impact energy during this kind of secondary collision, preventing the front section of the band-shaped plate sections 55 that protrudes further toward the front than the front edge of the base plate section 54 from deforming is preferable from the aspect of obtaining stable energy absorption performance. Therefore, it is possible to form ribs that run in the forward and backward direction in this protruding section, and it is possible to extend the base plate section 54 further forward than in the example illustrated in the figure and improve the bending rigidity of this section.

Figure 14:
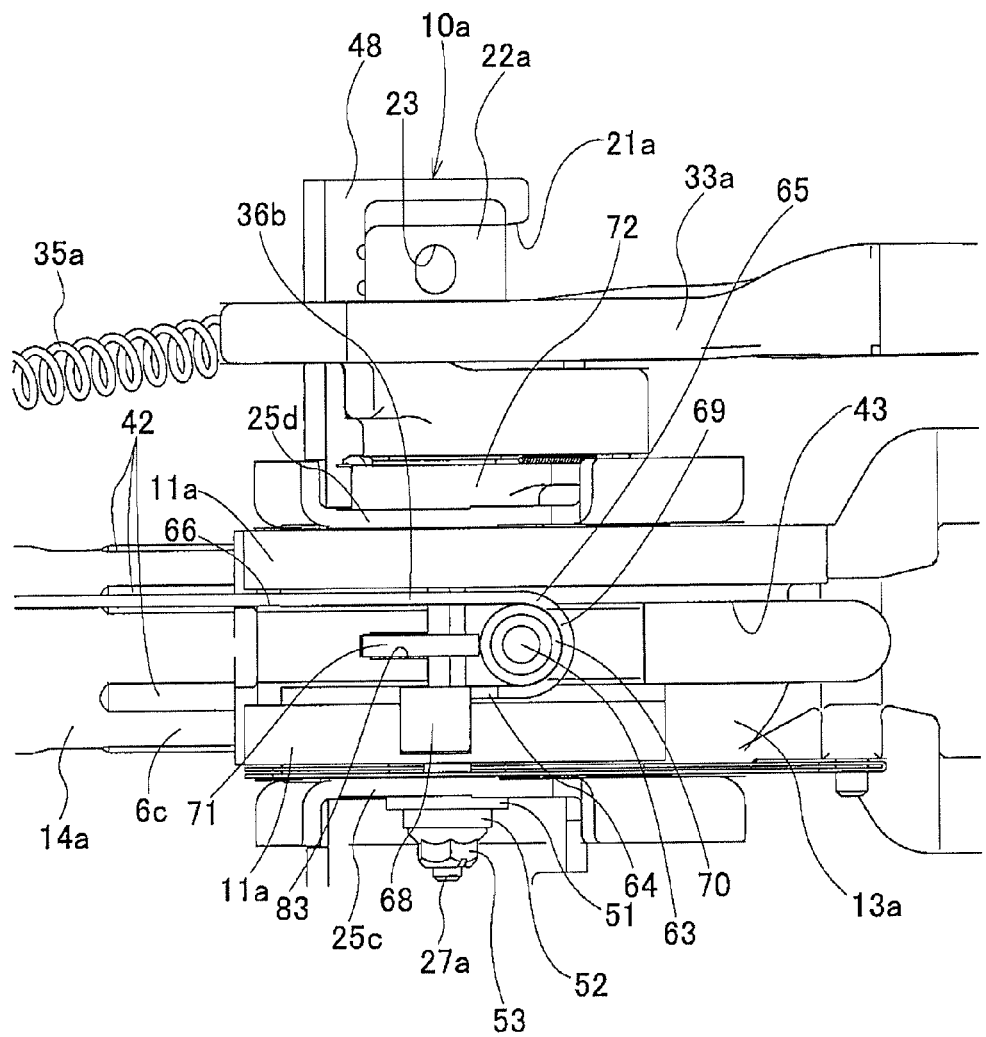
FIG. 14 is an orthographic projection illustrating the state as seen from the bottom, and is an enlarged view of area d in FIG. 11A.
Figure 15:
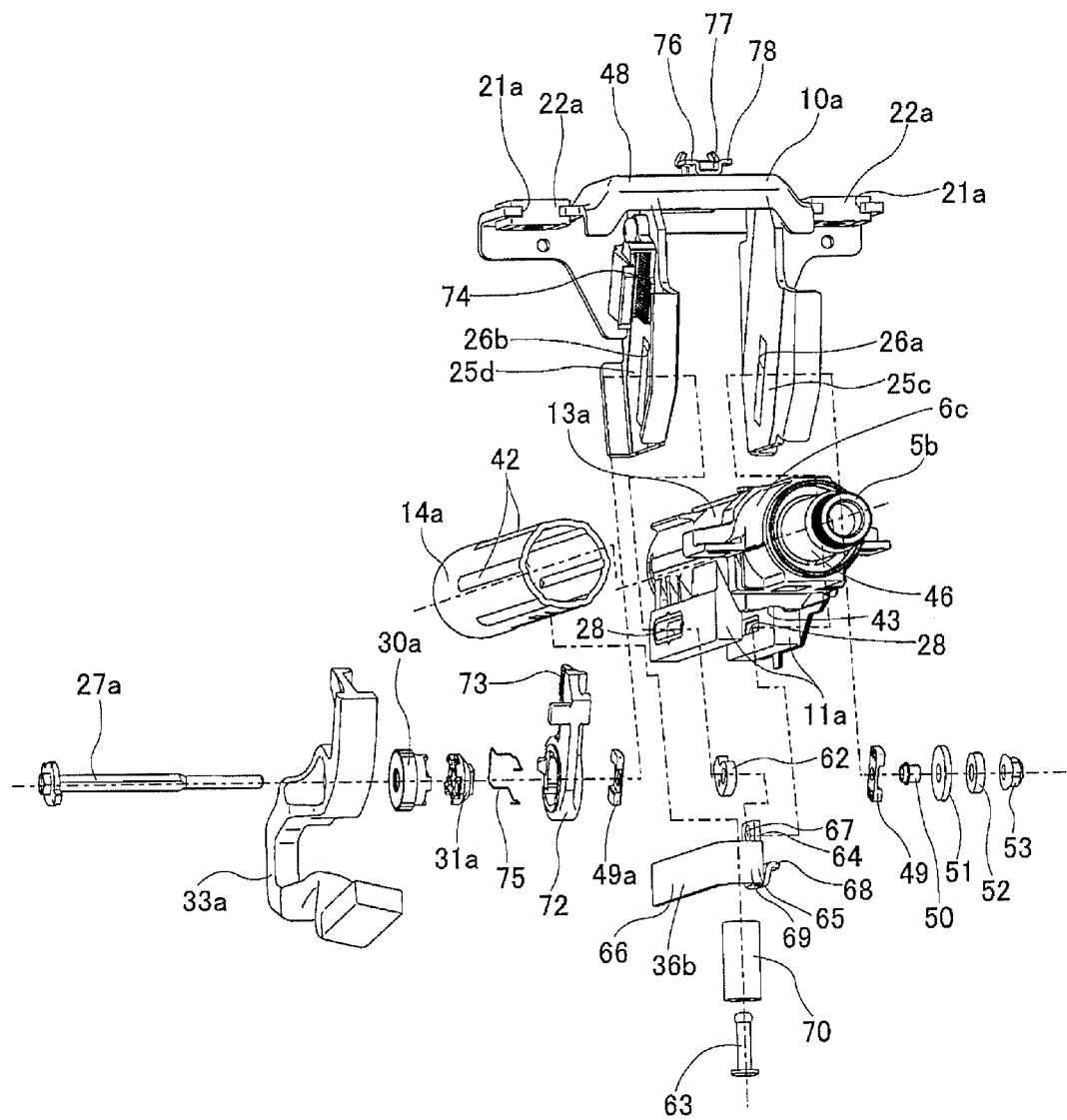
FIG. 15 is an exploded perspective view of the mechanism portion for adjusting the forward/backward position and vertical position of the outer column of the steering apparatus in FIG. 10 and illustrates the state as seen from the lower rear.
Figure 16:
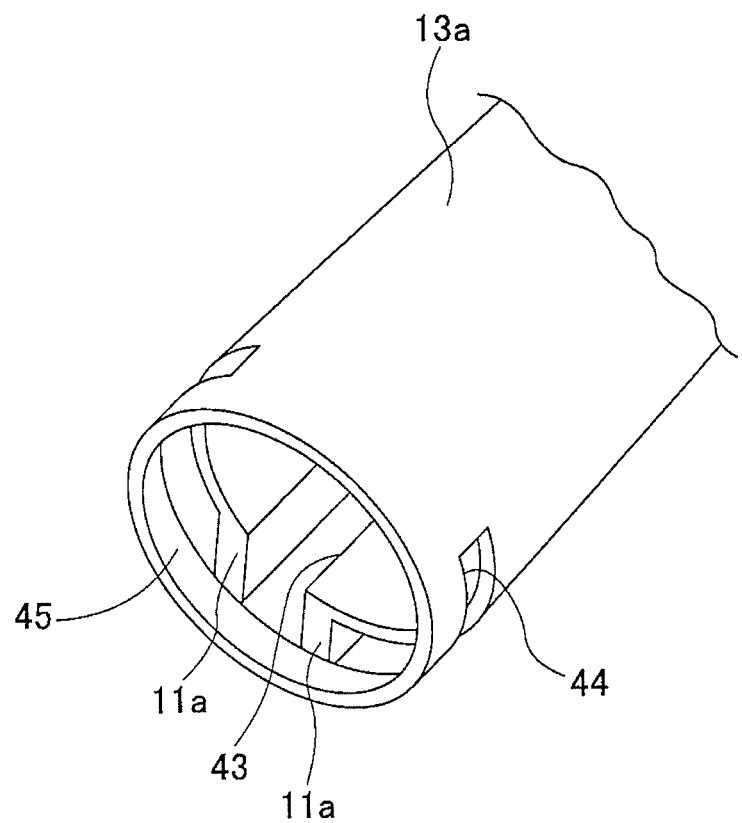
FIG. 16 is a perspective view of the front end section of the outer column of the steering apparatus in FIG. 10, and illustrates the state as seen from the upper front, with part of the shape of the outer circumferential surface being simplified.
Figure 17A:
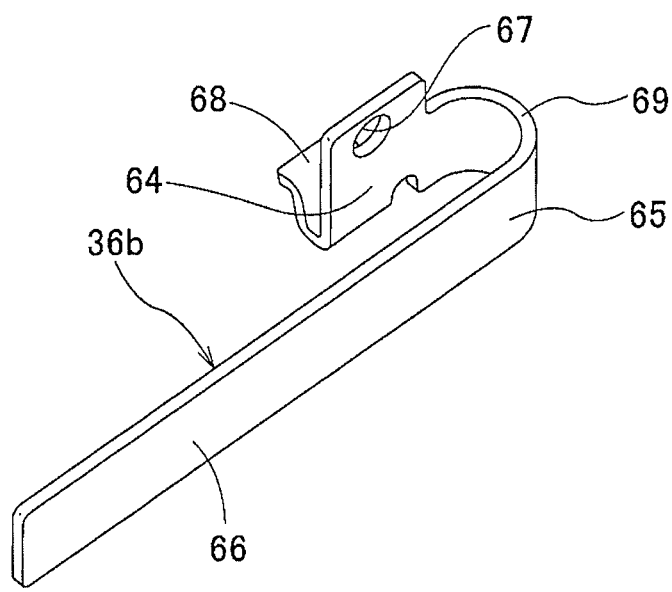
FIGS. 17A and 17B are perspective views of the energy absorbing member of the steering apparatus in FIG. 10, where
Figure 17B:
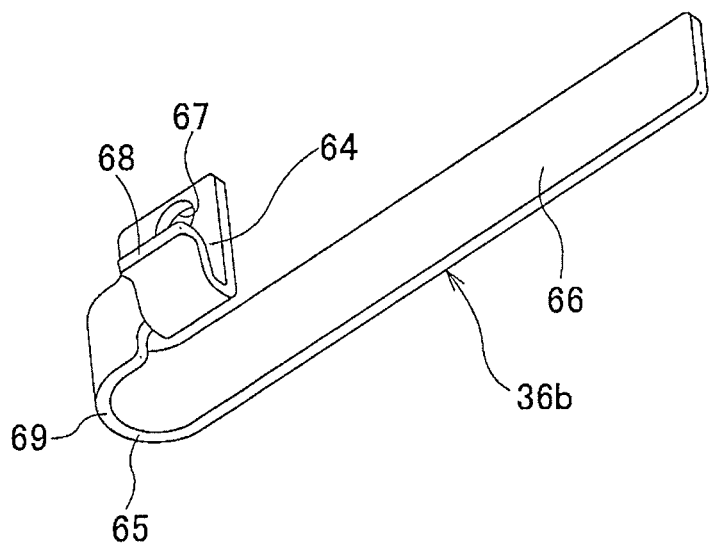

Moreover, in this embodiment, a cam member 71 is fitted inside the section between the pair of protruding sections 60 that are provided on the energy absorbing member 36a in the middle section of the tightening rod 27a. The tip end section of this cam member 71 is caused to displace upward (downward in the case of construction having an axial slit on the upper side of the outer column) as the lever 33a is rotated downward and the cam device 32a is loosened in order to adjust the forward/backward position of the steering wheel 1. This tip end section is caused to protrude upward (or downward) through the slit 43 that is formed on the front section of the outer column 13a from the inner circumferential surface of the outer column 13a and enter inside the locking hole 83 (FIG. 14) that is formed in the rear section of the inner column 14a. In this state, a force in the forward direction is applied to the outer column 13a by way of the steering wheel 1 and steering shaft 5b, and when the outer column 13a displaces in the forward direction, the front edge of the tip end section of the cam member 71 engages with the edge of the front end of the locking hole 83. In this state, the force in the forward direction is supported by the vehicle body by way of the inner column 14a, and is not transmitted to the support bracket 10a via the tightening rod 27a. Therefore, when the cam device 32a is in the loosened state, the capsule 22a does not come out from the cut out section 21a even when the outer column 13a is strongly pressed forward by way of the steering wheel 1 and outer shaft 46, and the support bracket 10a does not drop forward from the vehicle body.

In this example, the cam member 71 that comprises a function such as described, above is held between the pair of protruding sections 60. Therefore, even during a secondary collision, the distance between these protruding sections 60 is not excessively decreased, and the radius of curvature of the bent back sections 59 is kept nearly constant. As a result, from this aspect as well, plastic deformation of the energy absorbing sections 56 can be performed stably.

Furthermore, in the example, a structure is used for increasing the support strength for supporting the steering wheel 1 at a certain height position after adjustment. In other words, the base section of a pivot arm 72 fits around the middle section toward the base end of the tightening rod 27a such that it can pivot, and as the adjustment lever is rotated upward, this pivot arm 72 is pivoted upward. A male side gear 73 is provided on the tip end section of this pivot arm 72, and a female side gear 74 is provided on the top section of the outside surface of the holding plate section 25d. As the pivot arm pivots upward, these gears 73, 74 engage. In this engaged state, the tightening rod 27a is connected to the holding plate section 25d by way of the pivot arm 72, so that regardless of a large impact load due to a secondary collision, the height position of the steering wheel 1 does not shift or move much.

The driven cam 31a is installed to the base section of the pivot arm 72 in a state such that relative rotation with respect to the pivot arm 72 is possible, or in other words, in a state such that relative rotation with respect to the holding plate section 25d is prevented, and such that a little displacement in the vertical direction with respect to the pivot arm 72 is possible. In order for this, a tilting spacer 49a, which is installed to the driven cam 31a such that relative rotation is not possible, is fitted such that only moving up and down in the long hole 26b in the vertical direction is possible. A restoration spring 75 is located between the driven cam 31a and the pivot arm 72, and supports the driven cam 31a such that it can rise or lower a little with respect to this pivot arm 72 around the center position as the center. The reason for allowing this small amount of rising and lowering is that the height position of the steering wheel 1 can be adjusted smoothly in a single step, while the meshed position between the gears 63, 64 is in steps, so this small amount absorbs this difference.

With the construction of this example, constructed as described above, an impact absorbing steering apparatus can be obtained that is capable of excellent performance at low cost while maintaining the freedom of design. First, with construction in which the tightening rod 27a is placed on the bottom side of the outer column 13a as in the example in the figures, this tightening rod 27a and the energy absorbing member 36a can be arranged in series with each other in the axial direction of the outer column 13a. Even in construction where the tightening rod is placed at the top side of the outer column, the tightening rod and energy absorbing member can be arranged in series with each other in the axial direction of the outer column. When these members 27a, 36a are arranged in this way; a force that resists against displacement of the outer column 13a in the forward direction during a secondary collision, or in other words, resistance against plastic deformation of the energy absorbing member 36a is applied to the tightening rod 27a that becomes the center around which the outer column 13a pivots during a secondary collision. As a result, there is no moment acting on the outer column 13a in the direction that causes pivoting around the tightening rod 27a. It also becomes possible to stabilize the state of the friction fit between the front section of the outer column 13a and the rear section of the inner column 14a, as well as it is possible to stabilize the sliding motion of this section, and thus it is possible to stabilize the absorption state of absorbing impact energy during a secondary collision.

Moreover, in the case of the construction of this example, the inner circumferential surface of the front section of the outer column 13a and the outer circumferential surface of the rear section of the inner column 13a come in contact at the apexes of the ribs 42, so it is possible to stabilize the state of the friction fit between these circumferential surfaces, and thus it is possible to further stabilize the absorption performance of absorbing impact energy during a secondary collision.

Furthermore, in the construction of this example, the front half section of the outer shaft 44 and the rear half section of the inner shaft 45 are fitted together in a spline it by way of a coating layer made of a synthetic resin having a low friction coefficient, so the force required for extending or contracting the steering shaft 5b can be made low and stable. It is also possible to reduce the force necessary for adjusting the forward/backward position of the steering wheel, and thus further stabilize the absorption performance of absorbing impact energy during a secondary collision.

In order to absorb impact energy during a secondary collision, not onlyis the friction resistance at the area of engagement between the inner circumferential surface of the front section of the outer column 13a and the outer circumferential surface on the rear section of the inner column 14a used, but also the plastic deformation of the energy absorbing member 36a is used, so it becomes easier to stabilize the performance of absorbing impact energy, and tuning of this absorption performance can also be performed arbitrarily. Furthermore, of both end sections in the forward and backward direction of the energy absorbing member 36a, the rear end section is supported by the tightening rod 27a and the front end section is supported by the housing 41. These members 27a, 41 are originally installed in the steering apparatus, and are not new members that must be installed for installing the energy absorbing member 36a. Therefore, it is possible to suppress a rise in cost to install this energy absorbing member 36a.

Figure 9:
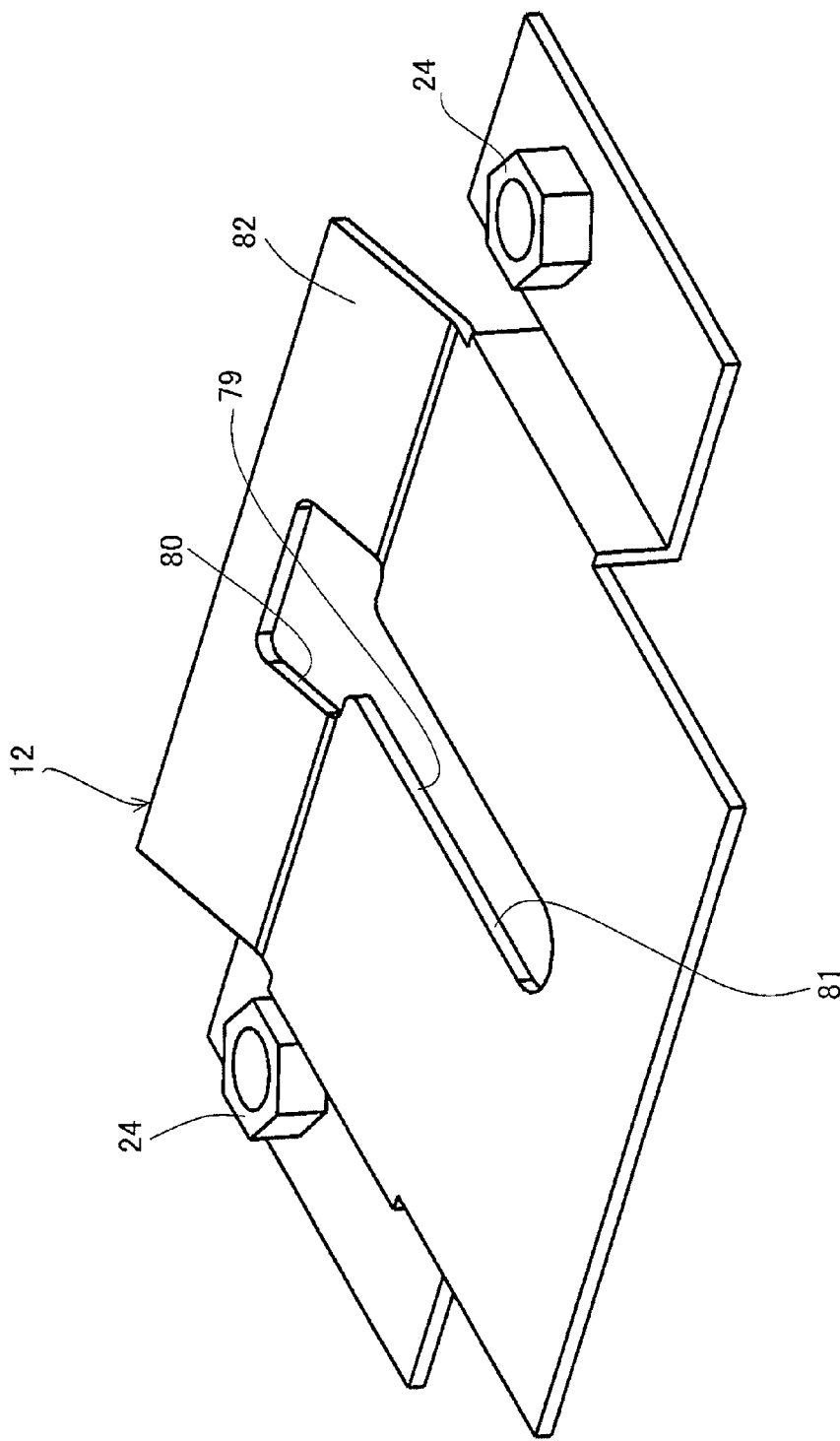
FIG. 9 is a perspective view of a bracket on the vehicle side of the steering apparatus in FIG. 1 as seen from the upper-front.
Figure 10:
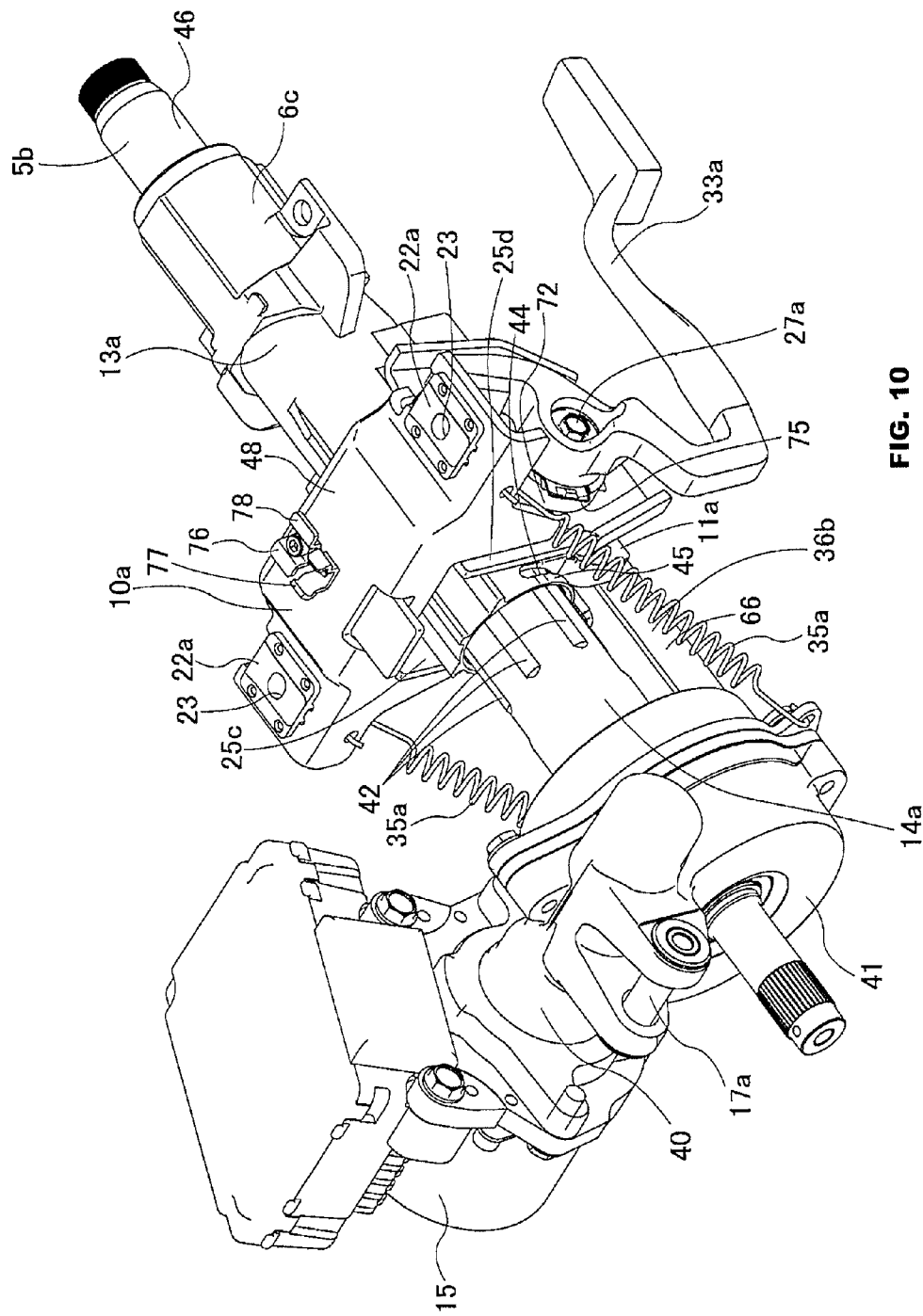
FIG. 10 is a perspective view of the normal state of an example of a steering apparatus of a second embodiment of the present invention as seen from the upper front.

In addition, in the case of the example illustrated in the figures, an installation bracket 76 is fastened to the center section of the top surface of the installation plate section 48 of the support bracket 10a in the portion near the rear end. The front half section of this installation, bracket 76 functions as an elastic locking section 77, and the rear half section functions as a guide rim section 78. On the other hand, in order to attach support bracket 10a, a locking hole 81 having a narrow section 79 and a wide section 80, as illustrated in FIG. 9, is formed in the bracket 12a on the vehicle side, which is fastened to the vehicle beforehand. The rear end section of the bracket 12a on the vehicle side is bent upward, anti of the locking hole 81, the wide section 80 is formed in this bent section 82. When installing a steering apparatus that includes the steering column 6c in the vehicle, first, the housing 41 is supported by the vehicle body by a bolt that is inserted though a support pipe 17a such that it can pivot. From this state, as the support bracket 10a is displaced upward together with the steering column 6c, the width of the elastic locking section 77 is elastically constricted and locked into the rear end section of the narrow section 79 of the locking hole 81. In this state, the support bracket 10a is temporarily fastened to the bracket 12a on the vehicle side, so the work of screwing and fastening this support bracket 10a to the bracket 12a on the vehicle side can be performed easily.

During a secondary collision, before the capsules 22a come out from the cut out sections 21a, and the support force of this support bracket 10a by these capsules 22a is lost, the guide rim section 78 enters into the narrow section 79 from the wide section 80. The engagement between both side sections of this guide rim section 78 and both side sections of the narrow section 79 of the bracket 12a on the vehicle side prevent the support bracket 10a from dropping down. As a result, as a secondary collision proceeds, it is possible to prevent the steering wheel 1 from dropping excessively, and it is possible to properly maintain the positional relationship between the airbag that spreads out at the rear of the steering wheel 1 and the body of the driver. In the case of a mild collision accident, it is possible to operate the steering wheel 1 even after the accident, and to lessen the work needed for removing the vehicle that was in the accident.

[Embodiment 2]

An example of a second embodiment of the present invention will be explained with reference to FIG. 10 to FIG. 17. In the impact absorbing steering apparatus of this embodiment, only the construction for absorbing impact energy during a secondary collision, or in other words, only the construction of the energy absorbing member differs from that of the first embodiment. Therefore, an explanation of construction that is the same as that of the first embodiment is omitted or simplified, and with the explanation below centering on the characteristic part, which is the energy absorbing member. In the explanation of this embodiment as well, the explanation is based on construction in which the tightening rod is located on the lower side of the outer column, however, needless to say, this form can also be applied to construction in which the tightening rod is located on the upper side of the outer column. In this case, as in the explanation of the first embodiment, the positional relationship of the members and between members is reversed in the vertical direction.

The energy absorbing member 36b, which is the characteristic feature of this embodiment, is located between the middle section in the axial direction of the tightening rod 27a, which is the portion that displaces in the forward direction with the outer column 13a during a secondary collision, and support pin 63 that fastens the base end section to the surface on the bottom end of the portion near the rear end of the inner column 14a, which is the outer circumferential surface of the portion near the rear end of the inner column 14a. This support pin 63 is provided for preventing the outer column 13a from coining apart toward the rear from the inner column 14a during the work of installing an impact absorbing steering apparatus having a telescoping mechanism in a vehicle. In other words, when the adjustment lever 33a is in a state of being rotated downwards before the support bracket 10a is installed in the vehicle in order to install the impact absorbing steering apparatus in the vehicle, there is a possibility that the outer column 13a will come apart from the inner column 14a together with the support bracket 10a. In order to eliminate this possibility, the support pin 63 is engaged with the axial slit 43. The part of this axial slit 43 on the front end edge side of the outer column 13a is covered by the a closed ring section 45, so the support pin 63 will not come out in the forward direction with respect to the outer column 13a. Therefore, even in the state of the adjustment lever 33a being rotated downward before installing the support bracket 10 in the vehicle, the outer column 13a is prevented from coming apart toward the rear from the inner column 14a.

The energy absorbing member 36b spans, between the support pin 63, having this kind of function, and the tightening rod 27a, and during a secondary collision, allows the steering wheel 1 and the outer column 13a to displace in the forward direction while absorbing impact energy that is applied to the outer column 13a from the steering wheel 1. The energy absorbing member 36b is formed by bending a plastically deformable metal plate such as a mild steel plate, and comprises a base plate section 64, a bent back section 65, and a deforming plate section 66, with the member being formed into a J-shape. The base plate section (34 is located, on the tip end section of the short edge side of the J shape, with the width in the vertical direction being wider than other portions, and one half in the width direction protrudes upward more than the other portions (downward in the case of applying the embodiment to construction having a slit on the upper side of the outer column). A through hole 67 is formed in the portion that protrudes upward (or downward). In the definition of the present invention, this through hole 67 corresponds to a third though hole. A contact plate section 68 is formed on the bottom edge (or top edge) of the base plate section by bending the plate into a state that protrudes toward the opposite side of the deforming plate section 66. The bent back section 65 has a U-shaped curved section 69 that opens toward the front, and is provided in a state such that it protrudes toward the rear from the rear edge of the base plate section 64. Furthermore, the deforming plate section 66 is provided in a state such that it extends toward the front from the edge of the tip end of the bent back section 65. The through hole 67 can be constructed as a long hole in the forward/backward direction in order to improve the absorption performance of absorbing impact energy dining the initial stage of a secondary collision, or in other words, to shift the instant when deformation of the deforming plate section 66 from the instant when the capsules 22a come out from the cutout section 21a.

By inserting the tightening rod 27a into the through hole 67 that is formed in the base plate section 64, the energy absorbing member 36b, constructed as described above, supports the outer column 13a together with the tightening rod 27a so that displacement in the axial direction of the outer column 13a is possible. In this state, the top surface (bottom surface in the case of applying the embodiment to construction having a slit on the upper side of the outer column) of the contact plate section 68 elastically comes in contact with the bottom end surface (or top end surface) of one of the held wall sections 11a of the pair of held wall sections 11a, and prevents the energy absorbing member 36b from rotating around the tightening rod 27a. The curved section 69 of the bent back section 65 is located on the rear side of the support pin 63. In this embodiment, a cylindrical roller 70, which functions as the cylindrical member of the present invention, is formed using a material that slides easily such as a synthetic resin and fits around the support pin 63 such that it rotates freely, and the bent back section 65 wraps around this roller 70. With this construction, when the energy absorbing member 36b plastically deforms, the sliding resistance between this roller 70 and the plastically deforming portion is reduced, so deviation in the impact energy absorption due to fluctuation in this friction resistance is reduced. Furthermore, the deforming plate section 66 is located in nearly the axial direction of the outer column 13a along the inside surface of the other held wall section 11a of the pair of held wall sections 11a.

Figure 11A:
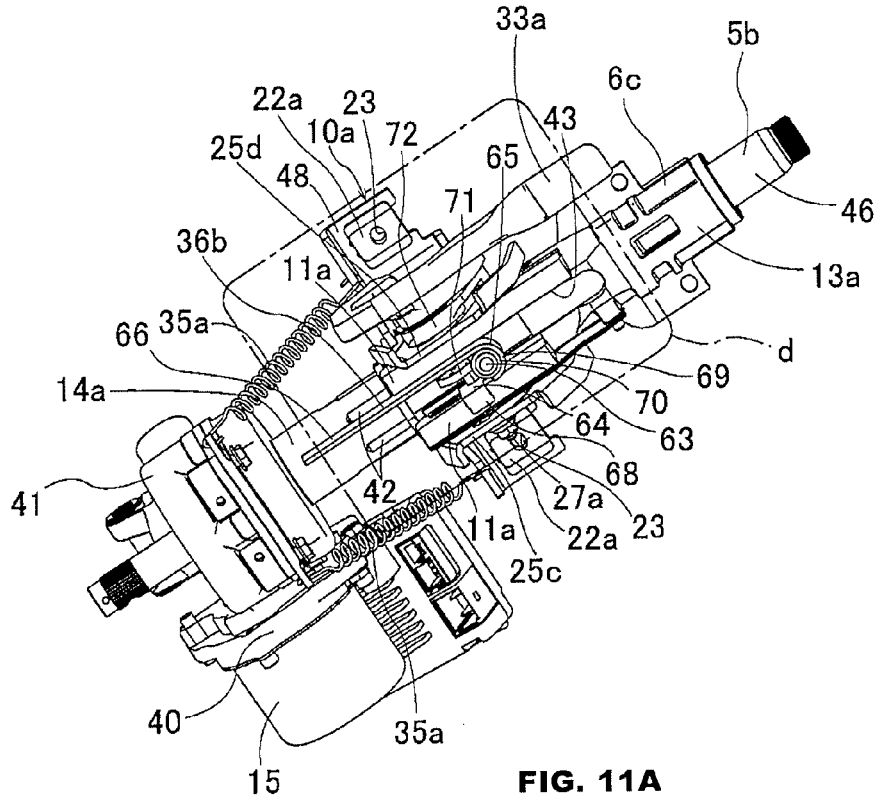
FIGS. 11A and 11B are perspective views of the steering apparatus in FIG. 10 as seen from the lower rear, where
Figure 11B:
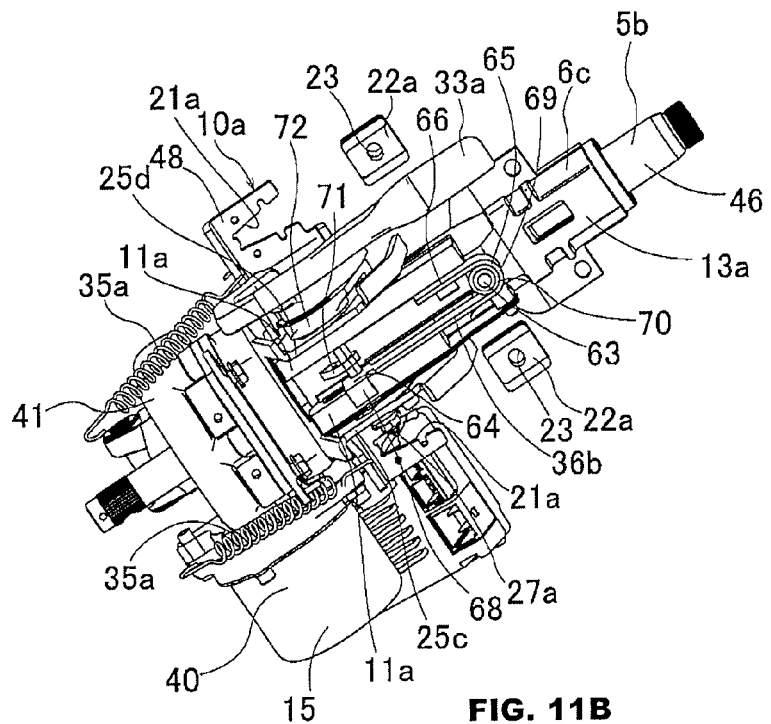
Figure 12:
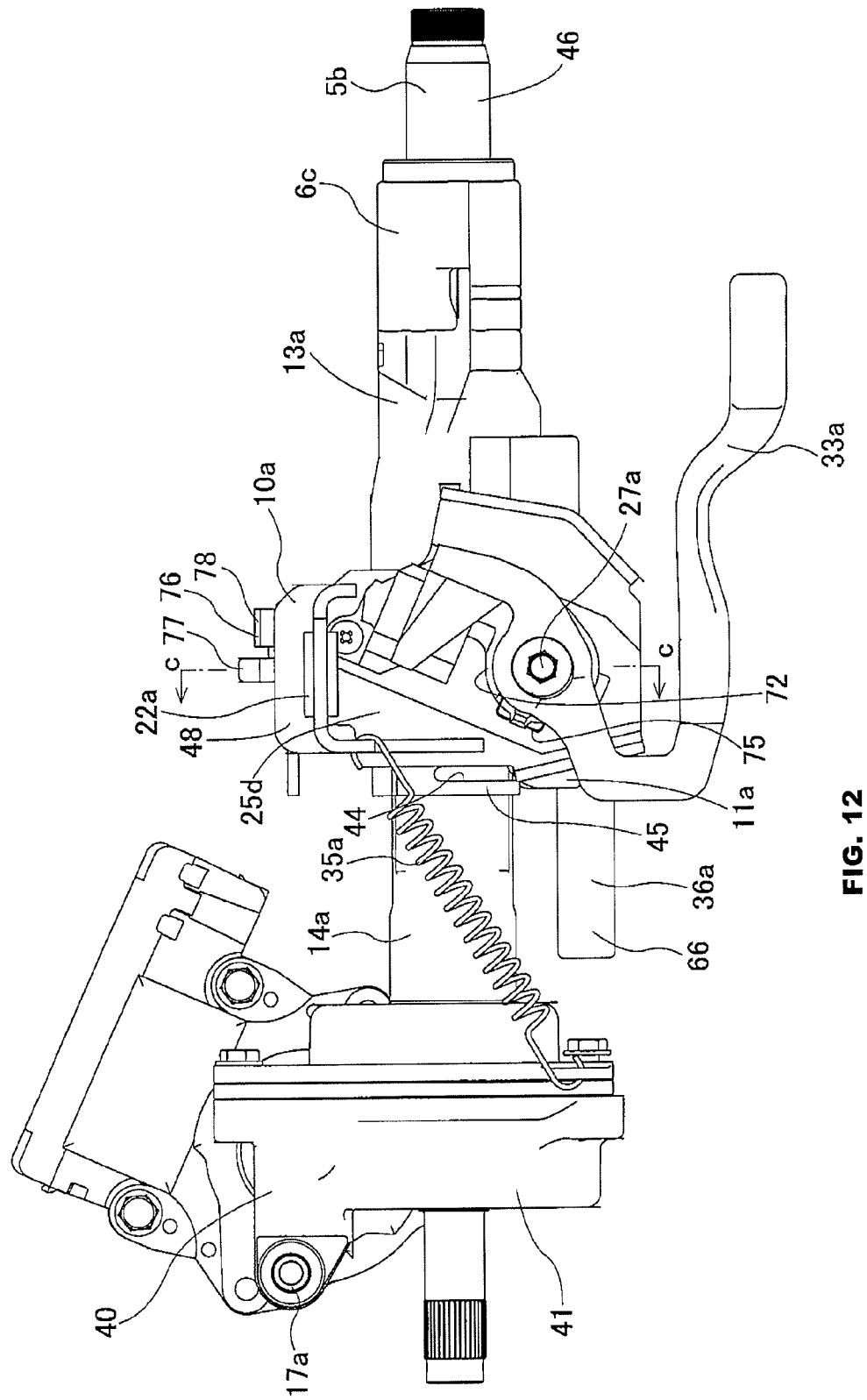
FIG. 12 is a side view of the normal state of the steering apparatus in FIG. 10.
Figure 13:
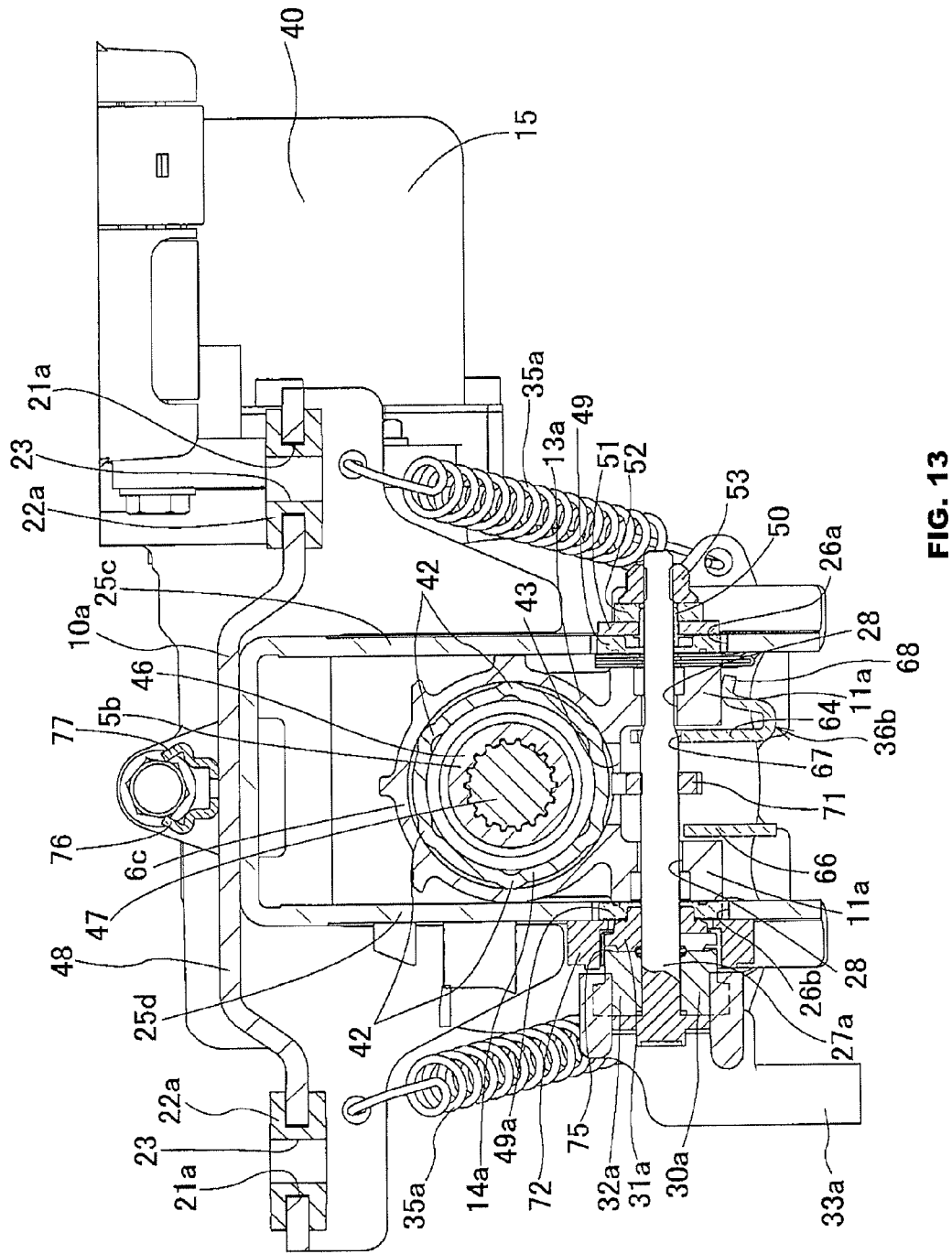
FIG. 13 is a cross-sectional view of section c-c in FIG. 12.

Comprising this kind of construction, the energy absorbing member 36b that is installed between the tightening rod 27a and the support pin 63 that is fastened to the inner column 14a in this way plastically deforms from the state illustrated in FIG. 11A to the state illustrated in FIG. 11B as a secondary collision proceeds. In other words, as the outer column 13a displaces in the forward direction as this secondary collision occurs, first, the outer column 13a displaces in the forward direction with respect to the tightening rod 27a within the telescopic adjustment range, or in other words, displaces until the tightening rod 27a moves to the rear end section of the long holes 28 in the forward/backward direction. When this happens, the impact energy that is applied from the steering wheel 1 to the outer column 13a is somewhat absorbed by the friction force acting on the contact section between the outer circumferential surface of the rear section of the inner column 14a and the inner circumferential surface of the front section of the outer column 13a.

After the tightening rod 27a has moved all the way to the rear end section of the long holes 28 in the forward/backward direction and the outer column 13a moves further forward, the support bracket 10 separates and drops from the vehicle body, and the tightening rod 27a begins to displace in the forward direction together with the outer column 13a. The base plate section 64 of the energy absorbing member 36b is pulled forward by the tightening rod 27a, and the deforming plate section 66 is forced by the roller 70 fitted around the support pin 63 and plastically deforms. More specifically, the curved section 69 moves toward the tip end side of the deforming plate section 66. When this happens, the deforming plate section 66 is plastically deformed by the roller 70, which absorbs the impact energy that is transmitted from the steering wheel 1 to the tightening rod 27a via the outer shaft

46 and outer column 13*a*. In this case, the base plate section 64 of the energy absorbing member 36*b* remains in contact with the other held wall section 11*a* of the pair of held wall sections 11*a*, and similarly the deforming plate section 66 remains in contact with the inside surface of the one held wall section 11*a*. The held wall sections 11*a* are rigid bodies that are obtained by being the cast using an, aluminum alloy, so the energy absorbing member 36*b* does not deform in an expanding direction to the left or right, and energy absorption by this plastic deformation of the energy absorbing member 36*b* can be performed stably. The absorption characteristics of absorbing impact energy during this kind, of secondary collision can be arbitrarily adjusted according to the rigidity in bending of the deforming plate section 66. For example, by gradually increasing the width and thickness dimensions of the deforming plate section 66 in the direction toward the tip end side, it is possible to absorb increasingly larger impact energy as the secondary collision proceeds, which is a useful characteristic from the aspect of protecting the driver. Moreover, normally, it is possible to tune the absorption characteristic of absorbing impact energy in the initial stage when a secondary collision occurs by providing a suitable gap between the outer circumferential surface of the roller 70 and the inner circumferential surface of the curved section 69.

Furthermore, in the case of this embodiment, a cam member 71 is located around the middle section of the tightening rod 27*a* in the section between the base plate section 64 and the deforming plate section 66 of the energy absorbing member 36*b*. As in the case of the first embodiment, by the front edge of the tip end section of this can member 71 engaging with the edge on the front end of the locking hole 83 of the inner column 14*a*, the capsules 22*a* will not come out from the cut out sections 21*a*, and the support bracket 10*a* will not separate from the vehicle body and drop toward the front even though the outer column 13*a* is strongly pressed in the forward direction by way of the steering wheel 1 and outer shaft 46 when the cam device 32*a* is in the loosened state.

With the impact absorbing steering apparatus of this second embodiment, having this kind construction, it is also possible to obtain the same effect as in the first embodiment. In this form, for example, it is also possible for another member other than the support pin 63 that displaces together with the outer column during a secondary collision to be the object of engagement with the inner circumferential surface of the curved section 69 of the energy absorbing member 36*b*. Different from a roller as a cylindrical member that fits around the support pin, it is possible to use a non-rotating member that fits around the support pin. In this way, in all forms, the present invention is not limited, to the detailed construction of the specific embodiments above.

[Industrial Applicability]

The present invention can be suitably applied to a steering apparatus having construction comprising both a telescoping mechanism and a tilting mechanism. However, the invention can also be applied to a steering apparatus having one only one or neither of these mechanisms. For example, when applying the present invention to construction that comprises only a telescoping mechanism, from the embodiments illustrated in the figures, the second through holes that are formed in the holding plate sections 25*c*, 25*d*, instead of being long holes 26*a*, 26*b* in the vertical direction, can be simple circular holes through which the tightening rod 27*a* can be inserted. On the other hand, in the case of applying the invention to construction having only a tilting mechanism, from the embodiments illustrated in the figures, the first through holes that are formed in the pair of held wall sections 11*a*, instead of being long holes in the forward/backward direction, can be simple circular holes though which the tightening rod 27*a* can be inserted. Furthermore, in the case of applying the present invention to construction not having a steering wheel position adjustment device, both the first through holes and second through holes can be simple circular holes. In the case of construction not having this kind of position adjustment device, the tightening rod can be a bolt, and the pair of pressure sections can be formed by the head of the bolt and, the nut that the bolt screws into. In this case, the nut functions as one pressure section, and functions as a fastening means. In this way, the present invention can be widely applied to an impact absorbing steering apparatus.

[Explanation of Reference Numbers]
1 Steering wheel
2 Steering gear unit
3 Input shaft
4 Tie rod
5, 5*a*, 5*b* Steering shaft
6, 6*a*, 6*b*, 6*c* Steering column
7 Universal joint
8 Intermediate shaft
9 Universal joint
10, 10*a* Support bracket
11, 11*a* Held, wall section
12, 12*a* Bracket on the vehicle side
13, 13*a* Outer column
14, 14*a* Inner column
15 Electric motor
16 Housing
17, 17*a* Support pipe
18 Top plate
19*a*, 19*b* Side plate
20 Connection plate section
21, 21*a* Cutout section
22, 22*a* Capsule
23 Through hole
24 Nut
25*a*, 25*b*, 25*c*, 25*d* Holding plate section
26, 26*a*, 26*b* Long hole in the vertical direction
27, 27*a* Tightening rod
28 Long hole in the forward/backward direction
29 Rim section
30, 31*a* Drive cam
31, 31*a*. Driven cam
32, 32*a* Cam device
33, 33*a* Adjustment lever
34 Locking section
35, 35*a*. Equalizer spring
36, 36*a*, 36*b* Energy absorbing member
37 Vehicle body
38 Support pin
39 Support casing
40 Electric-power steering apparatus
41 Housing
42 Rib
43 Axial slit
44 Circumferential slit
45 Closed ring section
46 Outer shaft
47 Inner shaft
48 Installation plate section
49, 49*a* Tilt spacer
50 Spacer
51 Washer
52 Thrust bearing
53 Nut
54 Base plate section 55 Band shaped plate section
56 Energy absorbing section
57 Through hole
58 Front end side installation section
59 Bent back section
60 Protruding section
61 Installation hole
62 Bolt
63 Support pin
64 Base plate section
65 Bent back section
66 Deforming section
67 Through hole
68 Contact plate section
69 Curved section
70 Roller
71 Cam member
72 Pivot arm
73 Male side gear
74 Female side gear
75 Restoration spring
76 Installation bracket
77 Elastic locking section
78 Guide rim section
79 Narrow section
80 Wide section
81 Locking hole
82 Bent back section
83 Locking hole

The invention claimed is:

1. An impact absorbing steering apparatus, comprising:
a steering column that comprises: an inner column that is located on the front side in a state in which the forward and backward position is regulated; and an outer column that fits around a rear section of the inner column such that relative displacement is possible in an axial direction, and that has a slit in the axial direction that is provided in the axial direction in a front section that fits with the inner column and enables the diameter of the front section to expand or constrict, a pair of held wall sections that are provided on a top surface or a bottom surface of the front section on both left and right sides of the axial slit, and a pair of first through holes that are formed in these held wall sections at positions that are aligned with each other;
a steering shaft supported on an inner diameter side of the steering column that comprises; an inner shaft; and an outer shaft that fits around a rear section of the inner shaft such that relative displacement in an axial direction is possible, and a rear end section of the outer shaft protruding further toward a rear than an opening on the rear end of the outer column, a steering wheel being supported by and fastened to the rear end section;
a support bracket that comprises: a pair of left and right holding plate sections; a pair of second through holes that are formed in these holding plate sections in positions that are aligned with at least part of the first through holes; and an installation plate section that is supported by a vehicle body and that together with supporting the holding plate sections, is capable of dropping toward the front due to impact energy that is applied from the steering wheel to the outer column during a secondary collision;
a tightening rod that is inserted through the first through holes and second through holes, and that comprises one pair of pressure sections, with one pressure section being located on one end of the tightening rod and the other pressure section being located on the other end of the tightening rod;
a fastening unit that increases or decreases the space between the pair of pressure sections, and when that space is decreased, decreases the diameter of the front section of the outer column and creates a friction fit between an inner circumferential surface of the front section of the outer column and an outer circumferential surface of the rear section of the inner column; and
an energy absorbing member that is located between a portion that displaces in the forward direction together with the outer column during the secondary collision and a portion that does not displace in the forward direction during that secondary collision, the energy absorbing member being made of a member that plastically deforms as the outer column displaces in the forward direction during the secondary collision, and absorbs part of the impact energy through the relative movement of the plastic deformation; wherein
the portion that displaces in the forward direction together with the outer column is the tightening rod,
the energy absorbing member comprises a U-shaped bent back section located on a rear end section of the energy absorbing member, a portion located on one end side of the bent back section and provided with a third through hole, and a portion extending toward the front from the other end of the bent back section,
by inserting the tightening rod through the third through hole, a rear section of the energy absorbing member is fastened to the tightening rod such that displacement in the forward direction together with the outer column during a secondary collision is possible,
the portion extending toward the front from the other end of the bent back section plastically deforms as the outer column displaces in the forward direction during the secondary collision, and
the plastic deformation of the member is restricted in the width direction by the pair of held wall sections of the outer column.

2. The impact absorbing steering apparatus according to claim 1, wherein a cam member fits around a middle section of the tightening rod, and when the tightening rod has been rotated in a direction that increases the diameter of the front section of the outer column, the cam member passes through the axial slit that is formed in the front section of the outer column and enters inside a locking hole that is formed in the rear section of the inner column.

3. The impact absorbing steering apparatus according to claim 1, wherein
the energy absorbing member comprises: a base plate section; a pair of left and right band-shaped plate sections that are bent from the edges on both the left and right sides of the base plate section in the same direction in the vertical direction; a pair of energy absorbing sections that are formed on the band-shaped plate sections in portions that protrude further toward the rear than a rear end edge of the base plate section; and front end installation sections that are provided in portions of the band-shaped plate sections that protrude further toward the front than a front end edge of the base plate section; wherein
each of the energy absorbing sections comprises the U-shaped bent back section, the portion located on one end side of the bent back section and provided with the third through hole, and the portion extending toward the front from the other end of the bent back section, and the U-shaped bent back sections are formed by bending rear end sections of the energy absorbing sections in a direction toward each other, the band-shaped plate sections are located along the inside surfaces of the held wall sections, and by connecting the front end installation sections to a member to which the front end section of the inner column is fastened, the front section of the energy absorbing member is fastened to the portion that does not displace in the forward direction during the secondary collision.

4. The impact absorbing steering apparatus according to claim 3, wherein a member capable of adjusting the space between the tip end sections of the pair of energy absorbing sections is located between those tip end sections.

5. The impact absorbing steering apparatus according to claim 4, wherein the member capable of adjusting the space is a cam member that fits around a middle section of the tightening rod, and when the tightening rod is rotated in a direction that increases the diameter of the front section of the outer column, the cam member passes through the axial slit that is formed in the front section of the outer column and enters inside a locking hole that is formed on the rear section of the inner column.

6. The impact absorbing steering apparatus according to claim 3, wherein the member to which the front end section of the inner column is fastened is a housing in which component parts of an electric-powered steering apparatus are housed, a front end installation sections comprise protruding plate sections that are bent from the front end edge of the band-connect shaped plate sections in directions opposite from each other, and these protruding plate sections and fasten to the rear end surface of the housing.

7. The impact absorbing steering apparatus according to claim 1, wherein the first through holes are constructed as long holes in the forward/backward direction that are long in the axial direction of the outer column, the forward/backward position of the outer column can be adjusted within the range that the tightening rod can displace inside these first through holes, and by operating an adjustment lever that is located on a base end section of the tightening rod, the space between the pair of pressure sections is expanded or contracted, such that when the space is contracted, the diameter of the front section of the outer column is decreased, and fastens the forward/backward position of the outer column.

8. The impact absorbing steering apparatus according to claim 1, wherein
the front end section of the inner column is supported by the vehicle body such that pivoting around a horizontal axis is possible;
the second through holes are constructed as long holes in the vertical direction that are long in the vertical direction and have a partial arc shape around the horizontal axis as a center;
the vertical position of the steering wheel can be adjusted within the range that the tightening rod can displace inside the long holes in the vertical direction;
when an adjustment lever that is located at a base end section of the tightening rod is operated, the space between the pair of pressure sections is increased or decreased; and
when the space is decreased, the space between the pair of holding plate sections is decreased, causing a friction fit between the inside surface of these holding plate sections and outside surfaces of the held wall sections, which fastens the vertical position of the outer column.

9. The impact absorbing steering apparatus according to claim 1, wherein a plurality of ribs that are long in the axial direction are formed around the outer circumferential surface of the inner column such that the outer circumferential surface of the inner column and the inner circumferential surface of the outer column come in contact at the apexes of these ribs.

10. The impact absorbing steering apparatus according to claim 1, wherein by forming a spline fit between male spline teeth that are formed around the outer circumferential surface on an end section of the inner shaft and female spline teeth that are formed around the inner circumferential surface on an end section of the outer shaft, extension and contraction is possible along the entire length of the spline shaft; and
a coating layer of synthetic resin having a low function coefficient is formed on the surface of at least one of the male spline teeth and female spline teeth.

\* \* \* \* \*